US009863098B2

(12) United States Patent
Penland, Jr. et al.

(10) Patent No.: US 9,863,098 B2
(45) Date of Patent: *Jan. 9, 2018

(54) HYBRID CRANE MAT WITH LIFTING ELEMENTS

(71) Applicant: QUALITY MAT COMPANY, Beaumont, TX (US)

(72) Inventors: Joe Penland, Jr., Beaumont, TX (US); Scott Calvert, Beaumont, TX (US); Chris L. Richardson, Beaumont, TX (US); Mike Carbaugh, Beaumont, TX (US)

(73) Assignee: Quality Mat Company, Beaumont, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/400,951

(22) Filed: Jan. 6, 2017

(65) Prior Publication Data

US 2017/0121916 A1   May 4, 2017

Related U.S. Application Data

(60) Continuation-in-part of application No. 15/377,545, filed on Dec. 13, 2016, now Pat. No. 9,617,693,
(Continued)

(51) Int. Cl.
*E01C 9/08* (2006.01)
*E01C 5/22* (2006.01)
(Continued)

(52) U.S. Cl.
CPC .............. *E01C 9/086* (2013.01); *B32B 7/005* (2013.01); *B32B 15/095* (2013.01);
(Continued)

(58) Field of Classification Search
CPC ... E01C 9/086; E01C 9/08; E01C 5/00; E01C 11/24
See application file for complete search history.

(56) References Cited

U.S. PATENT DOCUMENTS 2,836,529 A   5/1958   Morris
3,078,612 A   2/1963   Wait
(Continued)

FOREIGN PATENT DOCUMENTS

CA   2 233 776 A1   12/1999
CA   2 637 470 A1   1/2010
(Continued)

OTHER PUBLICATIONS

U.S. Appl. No. 15/244,614, Non-Final Rejection, dated Dec. 15, 2016.
(Continued)

*Primary Examiner* — Abigail A Risic
(74) *Attorney, Agent, or Firm* — Winston & Strawn LLP

(57) ABSTRACT

An industrial mat having a supporting structure; an upper layer provided above the supporting structure for forming an upper surface of the mat, a lower layer provided below the supporting structure for providing a lower surface of the mat; and lifting elements attached to the upper layer, the lower layer or the supporting structure. The lifting elements include D-shaped members, O-shaped members, U-shaped members, eyelets, hooks, circular or polygonal rings, chains, or cables that are configured and dimensioned for attachment to attached to the supporting structure or the upper or lower layer with sufficient strength to provide certified overhead lifting of the mat for installation and reclamation thereof.

24 Claims, 16 Drawing Sheets

Related U.S. Application Data which is a continuation-in-part of application No. 15/244,614, filed on Aug. 23, 2016, now Pat. No. 9,714,487, which is a continuation-in-part of application No. 15/188,113, filed on Jun. 21, 2016, now Pat. No. 9,663,903, which is a continuation-in-part of application No. 15/155,685, filed on May 16, 2016, which is a continuation-in-part of application No. 15/081,340, filed on Mar. 25, 2016, now Pat. No. 9,476,164, which is a continuation-in-part of application No. 15/056,212, filed on Feb. 29, 2016, now Pat. No. 9,447,547, which is a continuation-in-part of application No. 14/839,888, filed on Aug. 28, 2015, now Pat. No. 9,315,949, application No. 15/400,951, which is a continuation-in-part of application No. 15/331,130, filed on Oct. 21, 2016, now Pat. No. 9,605,390, which is a division of application No. 15/155,685, filed on May 16, 2016, which is a continuation-in-part of application No. 15/081,340, filed on Mar. 25, 2016, now Pat. No. 9,476,164, which is a continuation-in-part of application No. 15/056,212, filed on Feb. 29, 2016, now Pat. No. 9,447,547, which is a continuation-in-part of application No. 14/839,888, filed on Aug. 28, 2015, now Pat. No. 9,315,949.

(60) Provisional application No. 62/054,186, filed on Sep. 23, 2014, provisional application No. 62/138,143, filed on Mar. 25, 2015, provisional application No. 62/158,196, filed on May 7, 2015, provisional application No. 62/211,664, filed on Aug. 28, 2015.

(51) Int. Cl.

| | | |
|---|---|---|
| *E01C 5/00* | (2006.01) | |
| *B66C 1/66* | (2006.01) | |
| *B32B 7/00* | (2006.01) | |
| *B32B 15/095* | (2006.01) | |
| *B32B 21/04* | (2006.01) | |
| *B32B 21/12* | (2006.01) | |
| *B32B 27/08* | (2006.01) | |
| *B66C 23/78* | (2006.01) | |

(52) U.S. Cl.
CPC ............ *B32B 21/045* (2013.01); *B32B 21/12* (2013.01); *B32B 27/08* (2013.01); *B66C 1/66* (2013.01); *B66C 23/78* (2013.01); *E01C 5/006* (2013.01); *E01C 5/22* (2013.01); *E01C 9/083* (2013.01); *B32B 2307/712* (2013.01); *B32B 2471/04* (2013.01); *E01C 2201/10* (2013.01); *E01C 2201/12* (2013.01); *E01C 2201/16* (2013.01)

(56) References Cited

U.S. PATENT DOCUMENTS

| | | | |
|---|---|---|---|
| 3,078,621 A * | 2/1963 | Hinds | E04G 21/142 206/321 |
| 3,985,169 A | 10/1976 | Chow | |
| 4,324,037 A | 4/1982 | Grady, II | |
| 4,462,712 A | 7/1984 | Penland, Sr. | |
| 4,600,336 A | 7/1986 | Waller, Jr. | |
| 4,629,358 A | 12/1986 | Springston et al. | |
| 4,875,800 A | 10/1989 | Hicks | |
| 4,889,444 A | 12/1989 | Pouyer | |
| 4,932,178 A | 6/1990 | Mozingo | |
| 5,020,937 A | 6/1991 | Pouyer | |
| 5,032,037 A | 7/1991 | Phillips | |
| 5,050,366 A | 9/1991 | Gardner et al. | |
| 5,113,632 A | 5/1992 | Hanson | |
| 5,139,845 A | 8/1992 | Beckerman et al. | |
| 5,163,776 A | 11/1992 | Pouyer | |
| 5,241,163 A | 8/1993 | Vachtsevanos et al. | |
| 5,273,373 A | 12/1993 | Pouyer | |
| 5,342,260 A | 8/1994 | Markland | |
| 5,402,609 A | 4/1995 | Kelly, Jr. | |
| 5,535,694 A * | 7/1996 | Czipri | B63B 21/045 114/218 |
| 5,653,551 A | 8/1997 | Seaux | |
| 5,679,191 A | 10/1997 | Robinson | |
| 5,822,944 A | 10/1998 | Penland, Sr. | |
| 5,888,612 A | 3/1999 | Needham et al. | |
| 5,930,967 A | 8/1999 | Stoehr et al. | |
| 5,985,415 A | 11/1999 | Giltner | |
| 6,007,271 A | 12/1999 | Cole et al. | |
| 6,023,900 A | 2/2000 | Stoehr et al. | |
| 6,214,428 B1 | 4/2001 | Henderson | |
| 6,231,950 B1 | 5/2001 | Giltner | |
| 6,231,994 B1 | 5/2001 | Totten | |
| 6,365,650 B1 | 4/2002 | Chen et al. | |
| 6,380,309 B1 | 4/2002 | Parker et al. | |
| 6,450,235 B1 | 9/2002 | Lee | |
| 6,474,905 B1 | 11/2002 | Smith, Jr. | |
| 6,497,956 B1 | 12/2002 | Phillips et al. | |
| 6,511,257 B1 | 1/2003 | Seaux et al. | |
| 6,649,110 B1 | 11/2003 | Seaux et al. | |
| 6,662,508 B1 | 12/2003 | Else | |
| 6,695,527 B2 | 2/2004 | Seaux et al. | |
| 6,722,831 B2 | 4/2004 | Rogers | |
| 6,763,873 B2 | 7/2004 | Lee | |
| 6,821,623 B2 | 11/2004 | Kvesic | |
| 6,945,732 B2 | 9/2005 | Renick | |
| 7,137,226 B2 | 11/2006 | Fiutak et al. | |
| 7,303,800 B2 | 12/2007 | Rogers | |
| 7,404,690 B2 | 7/2008 | Lukasik et al. | |
| 7,413,374 B2 | 8/2008 | Rogers et al. | |
| 7,427,172 B2 | 9/2008 | Lukasik | |
| D609,956 S | 2/2010 | Lukasik | |
| 7,818,929 B2 | 10/2010 | Fiutak et al. | |
| 7,934,885 B2 | 5/2011 | Fournier | |
| 8,061,929 B2 | 11/2011 | Dagesse | |
| 8,070,004 B2 | 12/2011 | Williams et al. | |
| 8,088,477 B2 | 1/2012 | Curtis et al. | |
| 8,382,393 B1 | 2/2013 | Phillips | |
| 8,424,577 B2 | 4/2013 | Poutanen | |
| 8,613,373 B2 | 12/2013 | Holtby et al. | |
| 8,734,263 B2 | 5/2014 | Ford et al. | |
| 8,784,001 B1 | 7/2014 | Phillips | |
| 8,857,125 B2 | 10/2014 | Lu et al. | |
| 8,906,480 B2 | 12/2014 | Fiutak et al. | |
| 8,936,073 B1 | 1/2015 | Phillips | |
| 9,133,598 B2 | 9/2015 | Hsu | |
| 9,347,184 B2 | 5/2016 | Evelyn | |
| 9,476,164 B2 | 10/2016 | Penland, Jr. et al. | |
| 2002/0110418 A1 | 8/2002 | Renick | |
| 2004/0037644 A1 | 2/2004 | Renick | |
| 2004/0071914 A1 | 4/2004 | Fiutak et al. | |
| 2004/0253055 A1 | 12/2004 | Polivka, Jr. | |
| 2005/0022363 A1 | 2/2005 | Harrison | |
| 2006/0034654 A1 | 2/2006 | Sanders | |
| 2006/0179733 A1 | 8/2006 | Padmanabhan | |
| 2006/0260264 A1 | 11/2006 | Reynolds | |
| 2006/0265976 A1 | 11/2006 | Fiutak | |
| 2007/0056228 A1 | 3/2007 | Penland, Sr. et al. | |
| 2007/0237581 A1 | 10/2007 | Lukasik et al. | |
| 2008/0028703 A1 | 2/2008 | Brandstorm | |
| 2008/0085154 A1 | 4/2008 | Lukasik | |
| 2008/0152861 A1 | 6/2008 | Barker | |
| 2008/0292397 A1 | 11/2008 | Farney et al. | |
| 2009/0087261 A1 | 4/2009 | Fournier | |
| 2009/0301004 A1 | 12/2009 | Dagesse | |
| 2011/0233363 A1 | 9/2011 | Wold | |
| 2011/0280657 A1 | 11/2011 | Martinez | |
| 2012/0063844 A1 | 3/2012 | Wold | |
| 2013/0284872 A1 | 10/2013 | Tubbs | |
| 2013/0306804 A1 | 11/2013 | Holtby et al. | |
| 2013/0318896 A1 | 12/2013 | Rogers | |
| 2014/0154462 A1 | 6/2014 | Fiutak et al. | |

(56) References Cited

U.S. PATENT DOCUMENTS

| | | | |
|---|---|---|---|
| 2014/0183319 A1* | 7/2014 | Tubbs | B32B 7/08 248/346.02 |
| 2014/0186573 A1 | 7/2014 | Tubbs | |
| 2014/0193196 A1 | 7/2014 | Fournier | |
| 2014/0199119 A1 | 7/2014 | Stasiewich | |
| 2014/0205377 A1 | 7/2014 | Hill | |
| 2014/0341649 A1 | 11/2014 | Bryan et al. | |

FOREIGN PATENT DOCUMENTS

| | | |
|---|---|---|
| EP | 1 600 558 A1 | 11/2005 |
| EP | 2 705 950 A1 | 3/2014 |
| WO | 95/25076 A1 | 9/1995 |
| WO | 2006/002507 A1 | 1/2006 |
| WO | 2006/048654 A1 | 5/2006 |
| WO | 2007/112537 A1 | 10/2007 |

OTHER PUBLICATIONS

U.S. Appl. No. 15/377,545, Non-Final Rejection, dated Feb. 10, 2017.
Richard West Co., Inc., Steel Reinforced Crane Mat, downloaded from the internet on May 11, 2016 (see http://www.richardwestcompany.com/products.html).
Forest Products Laboratory. Wood Handbook—Wood as an Engineering Material—4. Mechanical Properties of Wood. U.S. Department of Agriculture. Online version available at: app.knovel.com/hotlink/pdf/id:kt0052LP04/wood-handbook-wood-an/mechanical-properties (1999).
"Inflammable". Wiktionary. Archived Sep. 6, 2014.
"Crane Mat", retrieved from http://www.qmat.com/products/crane-mats/ (2015).
Quality Mat Company website: http://www.qmat.com/ (2015).
International Search Report and Written Opinion, Appl. No. PCT/US2016/020081, dated Jun. 2, 2016.
Invitation to Pay Additional Fees, Appl. No. PCT/US2016/020067, dated Jun. 20, 2016.
International Search Report and Written Opinion, Appl. No. PCT/US2016/020067, dated Aug. 8, 2016.
U.S. Appl. No. 14/839,888, Non-Final Rejection, dated Nov. 6, 2015.
U.S. Appl. No. 14/839,888, Notice of Allowance, dated Jan. 14, 2016.
U.S. Appl. No. 14/839,888, Notice of Allowability, dated Feb. 19, 2016.
U.S. Appl. No. 15/056,212, Non-Final Rejection, dated Apr. 22, 2016.
U.S. Appl. No. 15/056,212, Notice of Allowance, dated Jun. 9, 2016.
U.S. Appl. No. 15/056,212, Notice of Allowability, dated Aug. 11, 2016.
U.S. Appl. No. 15/081,340, Non-Final Rejection, dated May 6, 2016.
U.S. Appl. No. 15/081,340, Notice of Allowance, dated Jun. 15, 2016.
U.S. Appl. No. 15/081,340, Notice of Allowability, dated Sep. 1, 2016.
U.S. Appl. No. 15/240,171, Non-Final Rejection, dated Dec. 20, 2016.
International Search Report and Written Opinion, Appl. No. PCT/US2017/014658, dated Jul. 10, 2017.
International Search Report and Written Opinion, Appl. No. PCT/US2017/014661, dated Jun. 20, 2017.

* cited by examiner

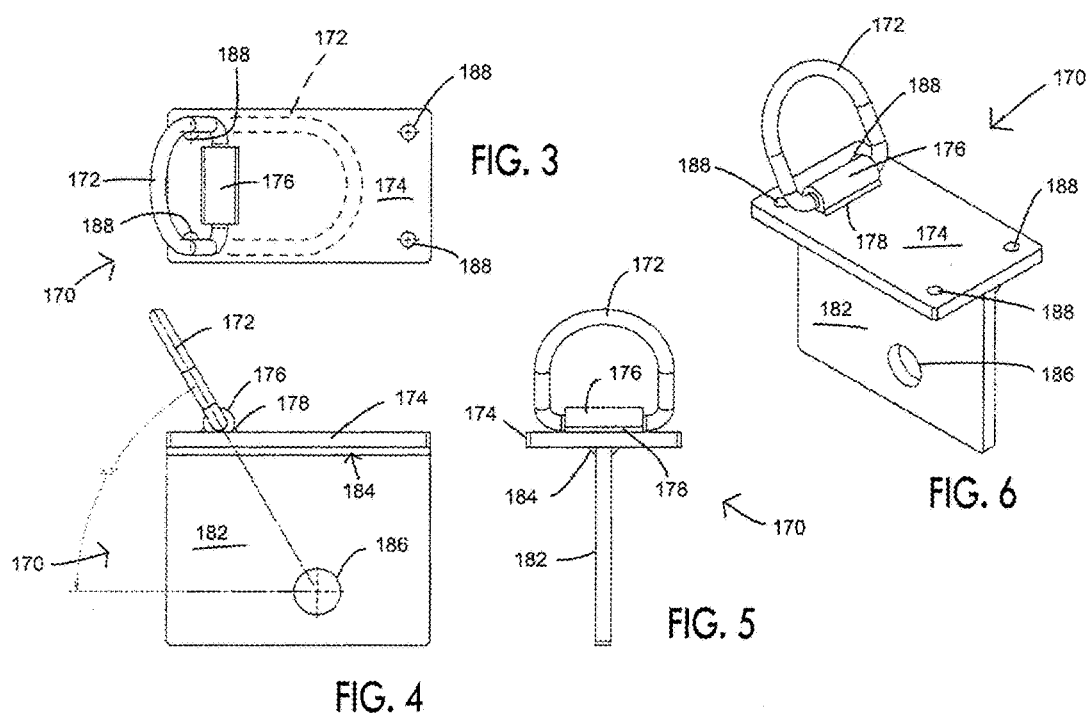

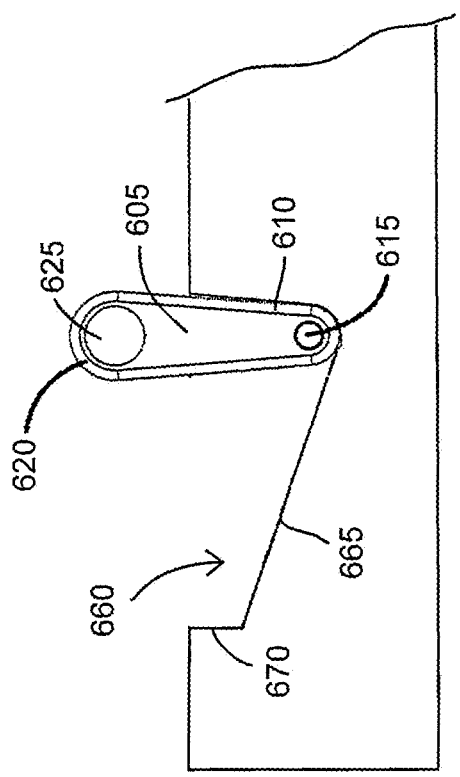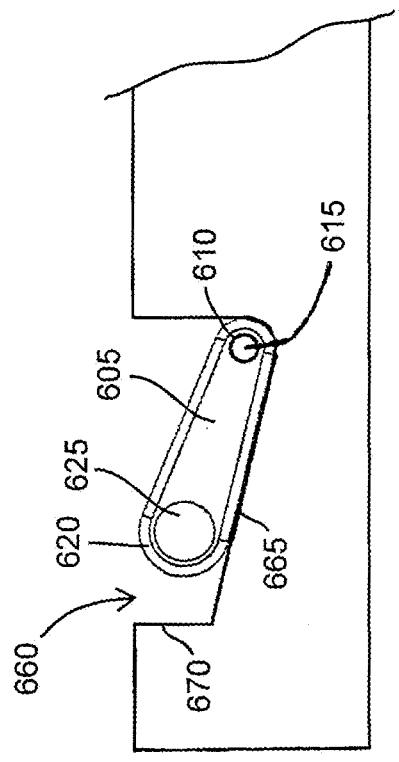

HYBRID CRANE MAT WITH LIFTING ELEMENTS

CROSS-REFERENCE TO RELATED APPLICATIONS

This application is a continuation-in-part of application Ser. No. 15/377,545 filed Dec. 13, 2016, which is a continuation-in-part of application Ser. No. 15/244,614 filed Aug. 23, 2016, which is a continuation-in-part of application Ser. No. 15/188,113 filed Jun. 21, 2016, which is a continuation-in-part of application Ser. No. 15/155,685 filed May 16, 2016, which is a continuation-in-part of application Ser. No. 15/081,340 filed Mar. 25, 2016, now U.S. Pat. No. 9,476,164, which is a continuation-in-part of application Ser. No. 15/056,212 filed Feb. 29, 2016, now U.S. Pat. No. 9,447,547, which is a continuation-in-part of application Ser. No. 14/839,888 filed Aug. 28, 2015, now U.S. Pat. No. 9,315,949, which claims the benefit of each of application Ser. Nos. 62/054,186 filed Sep. 23, 2014, 62/138,143 filed Mar. 25, 2015, and 62/158,196 filed May 7, 2015.

Application Ser. No. 15/244,614 filed Aug. 23, 2016 claims the benefit of application No. 62/211,664 filed Aug. 28, 2015.

This application is also a continuation-in-part of application Ser. No. 15/331,130 filed Oct. 21, 2016, which is a division of U.S. application Ser. No. 15/155,685 filed May 16, 2016, which is a continuation-in-part of U.S. application Ser. No. 15/081,340 filed Mar. 25, 2016, now U.S. Pat. No. 9,476,164, which is a continuation-in part of application Ser. No. 15/056,212 filed Feb. 29, 2016, now U.S. Pat. No. 9,447,547, which is a continuation-in-part of application Ser. No. 14/839,888 filed Aug. 28, 2015, now U.S. Pat. No. 9,315,949, which claims the benefit of each of application Ser. Nos. 62/054,186 filed Sep. 23, 2014, 62/138,143 filed Mar. 25, 2015, and 62/158,196 filed May 7, 2015.

Each of the foregoing applications is expressly incorporated herein by reference thereto.

BACKGROUND

The present invention relates to new, hybrid crane mats that have lifting elements for movement and installation of crane mats. These mats are typically used in construction sites that require heavy lifting, crane support stabilization, temporary areas for installation of pipelines or bridges, and other support structures in locations where the ground requires grading and stabilization to provide a flat support surface for such equipment or activities.

Conventional industrial mats are typically 4 feet wide and utilize beams having square or rectangular cross sections of sizes between 8×8 inch to 16×16 inch that are up to 40 feet in length that are connected by joining members or carriage bolts. Typically, the beams are made of oak and preferably white oak as that material provides acceptable performance of the mats for a significant service life at a reasonable cost. Such mats are available from Quality Mat Company, Beaumont, Tex. These mats, which are often called timber mats or crane mats. There are concerns regarding the lifting and movement of such mats due to their relatively large sizes.

In the past, lifting, manipulation and placement of the mats were facilitated by exposing part of the joining member for grasping by a lifting hook of a crane or other heavy piece of equipment. While the exposure of the joining or connecting rod facilitated lifting or moving operations, it presented an issue in that workers could inadvertently step into over the open hole that was provided around the connecting rod.

Also, the larger sizes of these mats require lifting elements that facilitate overhead lifting elements. Thus, other designs are needed to more easily move these large mats as well as to provide greater safety to personnel working on these mats. Also, it is desirable to have improvements in the construction of such mats to provide extended service lives and better performance in use.

SUMMARY OF THE INVENTION

The present invention now satisfies these needs in the art by providing new crane mats with improved properties as well having newly designed and improved lifting elements and associated structures and arrangements for lifting and manipulation of these crane mats. These lifting elements, structures and arrangements also provide a lower profile where the lifting elements are maintained below the working surface of the mat to promote safety for workers. Also, the mat construction enables the use of lower cost core materials that are protected by a metal frame which in turn is protected by various outer boards, beams and/or bumper members.

In particular, the invention now provides a crane mat comprising outer side members comprising first and second side beams or boards of engineered lumber, oak or other hardwoods, or bumper members of solid or filled or unfilled hollow plastic members that optionally may be reinforced; a core structure comprising a metal frame that includes side and end members and that contains therein a plurality of longitudinal members made of pine or other softwoods; external components including an upper layer of elongated members located above and attached to the core structure to protect the core structure, a lower layer of elongated members located below and attached to the core structure to also protect the core structure, or both of the upper and lower layers; and a plurality of joining rods that attach the outer side members to the core structure. The elongated members are advantageously made of wood, engineered wood, a metal such as steel, or a thermoplastic, thermosetting plastic, or elastomeric material, including recycled plastic materials.

The outer side members, side members of the frame and longitudinal members each generally include a plurality of spaced lateral apertures passing therethrough, with the lateral apertures being in alignment to form bores through the mat; wherein each joining member passes through each of the previously mentioned members through the aligned lateral apertures to hold the members together in the mat. Preferably, the mat further comprises steel plates of substantially the same height as the pine timbers with each plate located between adjacent pine timbers, wherein the joining rods also pass through the steel plates to hold those components together in the mat.

The crane mat advantageously includes one or more lifting elements each located in an opening in that is at least partially present in an elongated member of the upper or lower layer and a subjacent longitudinal member or present in adjacent elongated and longitudinal members of the upper or lower layer, with each lifting element connected to a joining rod to secure the lifting element to the mat; and with the lifting element(s) comprising a loop portion that is configured with an opening sufficient to receive and allow grasping by a hook, fingers, hand or other lifting member, and a securement portion that includes an opening sufficient to receive a joining member therein, with the loop and securement portions either connected to each other or forming a unitary lifting element, and with a joining member passing through the securement portion to attach the lifting element to the mat.

The opening is preferably configured and dimensioned to receive the lifting element therein in a storage position with the lifting element maintained at or below the surface of the mat when not used for lifting or moving of the mat or when securing articles thereto, and wherein the loop portion is movable to a lifting position that exposes the loop above the surface of the mat for engagement by a hook or other grasping element for certified overhead lifting, manipulation or movement of the mat or for securing other articles to the lifting element.

Alternatively, the frame member may further comprise one or a plurality of cross members attached to side members to strengthen the frame, with the longitudinal members located between cross members and with additional filler members located between the cross members and end members of the frame, wherein a joining member passes through the additional filler members through aligned lateral apertures therein to hold those members together in the mat. One or more lifting elements can be included, again with each located in an opening in that is at least partially present in an elongated member of the upper or lower layer and a subjacent longitudinal member or present in adjacent elongated and longitudinal members of the upper or lower layer, with each lifting element connected to a cross member to secure the lifting element to the mat.

The crane mat preferably includes outer end members to protect the end members of the frame, the outer end members comprising first and second side beams of engineered lumber, oak or other hardwoods, or bumper members of solid or filled or unfilled hollow plastic members that optionally may be reinforced. Also, the side and end members of the frame are preferably made of steel C-beams that retain the longitudinal members therebetween.

The working surfaces of the mat can be configured in different ways. In one arrangement, the outer side members each have a top surface and is located in a position that aligns the top surface of each outer side member with the upper surfaces of the elongated members of the upper layer to form an upper working surface for the mat. Additionally, the outer side members each also may have a bottom surface and is located in a position that aligns the bottom surface of each outer side member with the lower surfaces of the elongated members of the lower layer to form a lower working surface for the mat. Alternatively, the elongated members of the upper or lower layers extend across the entire width and length of the mat including over the outer side members to form a working surface for the mat.

For the lifting elements, the loop portion preferably is a D- or O-shaped ring and the attachment portion is a U-shaped member attached to the support plate and having a sufficient opening to allow the loop portion to pivot between the storage and lifting positions. The support plate is preferably oriented and positioned to be parallel to but beneath the working surface of the mat, with the attachment member located on an upper surface of the support plate, and the base plate is attached to a lower surface of the support plate and is oriented perpendicularly thereto. The lifting element is made of steel or another metal, preferably one that is weldable, so that the attachment member and base plate can be welded to the support plate. The recess is preferably a horizontally configured recess provided beneath the working surface of the mat upon adjacent longitudinal beams with the base plate extending in the space between the beams, wherein the recess has a depth that is greater than the combined thickness of the support plate, attachment member and loop member so that the lifting element resides beneath the working surface of the mat when in the storage position.

Another embodiment of the invention relates to a crane mat having a working surface and comprising outer side members comprising first and second side beams or boards of engineered lumber, oak or other hardwoods, or bumper members of solid or filled or unfilled hollow plastic members that optionally may be reinforced; a core structure comprising a plurality of longitudinal members; a plurality of joining rods that attach the outer side members to the longitudinal members of the core structure; one or more lifting elements comprising a loop portion that is configured with an opening sufficient to receive and allow grasping by a hook, fingers, hand or other lifting member, and a securement portion for attachment to a component that is present in the core structure. The mat includes an opening or recess in the working surface which is configured and dimensioned to receive the lifting element therein in a storage position with the lifting element substantially filling the recess and maintained at or below the working surface of the mat when not used for lifting or moving of the mat or when securing articles thereto. The loop portion is movable to a lifting position that exposes the loop above the surface of the mat for engagement by a hook or other grasping element for certified overhead lifting, manipulation or movement of the mat or for securing other articles to the lifting element.

The core structure can includes only longitudinal members with or without intermediate steel plates of the same height and length so that the upper surfaces of the longitudinal members form at least part of the working surface of the mat. Each lifting element then would be located in an opening that is at least partially present in an elongated member of the upper or lower layer and a subjacent longitudinal member or present in adjacent elongated and longitudinal members of the upper or lower layer, with each lifting element connected to a joining rod to secure the lifting element to the mat. In particular, the securement portion of each lifting element would include an opening sufficient to receive a joining member therein, with the loop and securement portions either connected to each other or forming a unitary lifting element, and with the joining member passing through the securement portion to attach the lifting element to the mat.

Alternatively, the frame member may further comprise a metal frame that includes side and end members, and wherein the outer side members, side members of the frame and longitudinal members each include a plurality of spaced lateral apertures passing therethrough, with the lateral apertures being in alignment to form bores through the mat; wherein each joining member passes through each of the previously mentioned members through the aligned lateral apertures to hold the members together in the mat. The frame preferably includes one or a plurality of cross members attached to side members to strengthen the frame, with the longitudinal members located between cross members and with additional filler members located between the cross members and end members of the frame, wherein a joining member passes through the additional filler members through aligned lateral apertures therein to hold those members together in the mat. Thus, the one or more lifting elements are connected to a cross member to secure the lifting element to the mat.

In yet another embodiment, the recess provides a sufficient opening in the mat to expose a portion of the joining member and the lifting element comprise a ring, cable, or chain that receives the exposed joining member. Advantageously, the recess opening also provides sufficient space to receive and maintain the lifting element in the storage position beneath the working surface of the mat. If desired, the opening of the recess can be reinforced with metal plates or a collar which protects the opening from contact by the ring, chain or cable and which adds stability as the mat is being lifted or moved.

The invention also provides a crane mat having a working surface and an opening or recess in the working surface. This crane mat comprises outer side members comprising first and second side beams or boards of engineered lumber, oak or other hardwoods, or bumper members of solid or filled or unfilled hollow plastic members that optionally may be reinforced; a core structure comprising a plurality of longitudinal members; a plurality of joining rods that attach the outer side members to the longitudinal members of the core structure; and one or more lifting elements. The lifting elements include a loop portion that is configured with an opening sufficient to receive and allow grasping by a hand, fingers, or a hook or other lifting member, a support member for supporting the loop portion, and a securement portion for securing the lifting element to the mat, wherein the loop portion, support member and securement portions are connected to each other. The mat opening is configured and dimensioned to have a floor for receiving the support member, a channel for receiving the securement portion, and a depth that allows the lifting element to be received in the opening with the loop portion in a storage position that is maintained at or below the working surface of the mat when not used for lifting or moving of the mat or for securing articles thereto, wherein the support member is secured to the floor of the opening or recess with the securement portion fixed in position in the mat, wherein the loop portion is movable to a lifting position that exposes the loop above the working surface of the mat for engagement by a hook or other grasping element for certified overhead lifting, manipulation or movement of the mat or for securing other articles to the mat.

One version of the mat has the upper surfaces of the longitudinal members forming at least part of the working surface of the mat, wherein the opening or recess is present in one or adjacent longitudinal members, and wherein the mat optionally includes metal plates of the same height and length as the longitudinal members and which are provided between adjacent longitudinal members.

Another version further comprises e external components including an upper layer of elongated members located above and attached to the core structure to protect the core structure, a lower layer of elongated members located below and attached to the core structure to also protect the core structure, or both of the upper and lower layers; wherein the elongated members are made of wood, engineered wood, metal or a thermoplastic, thermosetting plastic, or elastomeric material, wherein each lifting element is located in an opening that is at least partially present in an elongated member of the upper or lower layer and a subjacent longitudinal member or present in adjacent elongated and longitudinal members, with each lifting element connected to a joining rod to secure the lifting element to the mat.

Another version of the mat has a lifting element that further comprises a body member for joining the loop and securement portions, wherein the body member extends in the channel and into the mat away from the support member, and is fixed in position by the support member and securement portion, wherein the securement portion includes an opening sufficient to receive a joining rod therein, and with a joining rod passing through the securement portion to attach the lifting element to the mat.

Also, for some mats, the core structure further comprises a metal frame that includes side and end members, and wherein the outer side members, side members of the frame and longitudinal members each include a plurality of spaced lateral apertures passing therethrough, with the lateral apertures being in alignment to form bores through the mat; wherein each joining rod passes through each of the previously mentioned members through the aligned lateral apertures and bores to hold the members together in the mat.

The invention also relates to a lifting element for a crane mat that has a working surface, a plurality of longitudinal members, and an opening or recess for receiving the lifting element. This lifting element comprises a loop portion that is configured with an opening sufficient to receive and allow grasping by a hand, fingers, or a hook or other lifting member; a support member for supporting the loop portion; and a securement portion for securing the lifting element to the mat; wherein the loop portion, support member and securement portions are connected to each other and wherein the support member is secured to the opening or recess in the mat. The opening is configured and dimensioned to have a floor for receiving the support member, a channel for receiving the securement portion, and a depth that allows the lifting element to be received in the opening with the loop portion in a storage position that is maintained at or below the working surface of the mat when not used for lifting or moving of the mat or for securing articles thereto. Thus, the support member and securement portion are fixed in the mat while the loop portion is movable to a lifting position that exposes the loop above the working surface of the mat for engagement by a hook or other grasping element for certified overhead lifting, manipulation or movement of the mat or for securing other articles to the mat.

The lifting element generally has a body member for joining the loop and securement portions, wherein the body member extends in the channel and into the mat away from the support member, and is fixed in position by the support member and securement portion. In one embodiment, the body member comprises an elongated rod that passes through the mat from the working surface to the opposite side, the support member is a head portion of the elongated rod that has openings for receiving and securing the loop portion thereto, and the securement portion comprises a threaded end of the rod member and a fastening nut, such that the lifting element is secured to the mat with the head and loop portions provided in the opening and with the nut present in an opening or recess on the opposite side of the mat from the working surface. If desired, the lifting element can include a first contact plate present between the head portion and the floor of the opening; a second contact plate between the nut and the recess; or both first and second contact plates so that the lifting element is more securely attached to the mat.

In another embodiment, the loop portion of the lifting element is a ring member that is secured to the support member in a manner that allows the ring to pivot between the storage and lifting positions, the body member comprises a first plate that passes into the mat, the support member has a thickness that is greater than that of the first plate and the mat includes lateral rods for joining together the longitudinal members and the securement portion includes an opening in the first plate sufficient to receive therein one of the lateral rods of the crane mat to attach the lifting element to the mat.

In yet another embodiment, the body member of the lifting element comprises a first plate that passes into the mat, the support member is a second plate oriented perpendicular to the first plate, wherein the support member plate includes holes to receive fasteners that secure the support member plate to the floor of the opening or recess, wherein the mat includes lateral rods for joining together the longitudinal members and the securement portion includes an opening in the first plate sufficient to receive therein one of the lateral rods of the crane mat to attach the lifting element to the mat. Preferably, the loop portion is a D-ring that is attached to the support member by a U-shaped member that is welded to one side of the second plate, and the body member is welded to the opposite side of the second plate.

Other embodiments are disclosed in the detailed description.

Generally, between 2 and 12 lifting elements are provided in the mat, preferably in a symmetrical pattern. The openings or recesses for at least two of the lifting elements are spaced about 1 to 3 feet from the front or rear ends of the mat so as to provide easy access by the crane or lifting device.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which:

FIG. 3 is a top view of a first embodiment of a lifting element for use in the present invention;

FIG. 4 is a side view of the lifting element of FIG. 3;

FIG. 5 is a front view of the lifting element of FIG. 3;

FIG. 6 is a perspective view of the lifting element of FIG. 3;

FIG. 19 includes FIGS. 19A and 19B which are a partial sectional views of a variation of the crane mat of FIG. 17 with the lifting element in operative and storage positions, respectively.

DETAILED DESCRIPTION OF THE INVENTION

Figure 1:
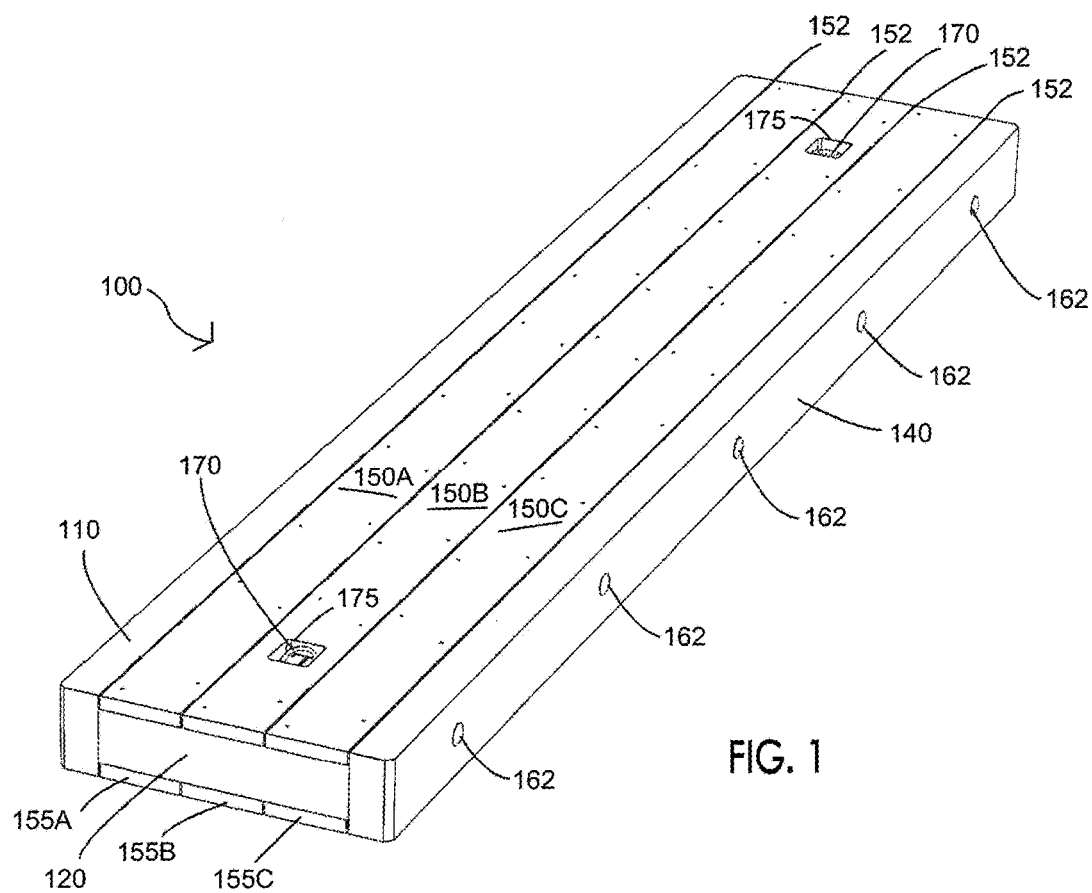
FIG. 1 is a perspective view of a first embodiment of a crane mat having new lifting elements according to the present invention.

The new and improved crane mats of the present invention now provide a number of surprising advantages over conventional crane mats. The provision of a one or more lifting elements that are securely attached to these mats facilitates overhead lifting and manipulation of the mats in a much more secure manner. By securing the lifting element directly to the joining rod of the mat, the weight of the mat becomes directly distributed from the mat onto the joining rod to the lifting element. Prior crane mats included a large opening to expose the joining rod to enable a crane hook to access the rod for lifting. The provision of the lifting elements of the present invention now provides much smaller recesses and openings compared to conventional crane mats to avoid having workers operating on the upper surface of the mat from tripping over or stepping into the hole. In addition, the recesses and holes are sized and configured to receive the lifting element when not in use to provide essentially a flat in uniform top surface of the mat in the area where the lifting element is located, yet still allow the loop portion of the lifting element to be simply and easily accessed and exposed when the mat needs to be moved.

Another advantage of the present invention is that the lifting element is configured such that when the loop portion is exposed above the working surface of the mat, it also can be used to tie down equipment, tents, or other items to the mat to stabilize and secure such items to prevent movement during use.

Certain terms that are used herein are defined hereinbelow to assist in the understanding of the invention.

The term "crane mat" is intended to cover relatively large mats made primarily of longitudinal beams or timbers having widths of at least about 4 feet with lengths running from about 4 feet to 40 feet and incorporating elongated members, beams, or other components having square or rectangular cross sections of sizes of at least about 6×6 to 24×24 inches with lengths from about 4 feet to as much as 40 feet or more. Preferred dimensions are described throughout the specification. As noted, previous and current mats of this type that are commercially available are primarily constructed of monolithic wood and typically of oak.

The term "non-wood" to describe the longitudinal beams or the support structure is used for its ordinary meaning. The components of the structure are generally not made of wood but instead are made of metal, a thermosetting plastic or other materials that are resistant to degradation due to environmental factors such as moisture from water, snow or ice, organisms that can cause wood rot, or similar external factors that affect wood.

The term "substantially" is used for its ordinary meaning to indicate that the dimensions are not precise or exact. A skilled artisan can readily determine what tolerances are acceptable to provide a surface that is considered to be flat based upon the size of the side beams and the type of service that the mat is expected to provide. There is no requirement that the beams and elongated members be flush with each other along the top and bottom surfaces of the mat. Typically, the term "substantially' will mean that the top surfaces of the beams and elongated members can vary by as much as a few inches although in the more preferred embodiments the variance is less than 1 inch.

Additionally, all dimensions recited herein are approximate and can vary by as much as ±10% to in some cases ±25%. In some situations, the term "about" is used to indicate this tolerance. And when the term "about" is used before reciting a range, it is understood that the term is applicable to each recited value in the range. Often, the craftsmanship and engineering procedures that are followed in construction of these mats minimize these tolerances as much as possible or industrially practical.

The outer top and bottom surfaces of the mat are deemed to be the working surfaces of the mat. Generally, the mat can have different upper and lower surfaces recognizing that one surface faces the ground while the other is used as a road, platform or other working surface, but preferably, the upper and lower surfaces are the same so that either surface can be faced downward with the opposite surface used for supporting equipment or allowing movement on the mat. Also, the surfaces are preferably made with symmetry as to the lifting elements to facilitate efficient lifting of the mats.

The mat is typically made of longitudinal members having a rectangular cross-section with all members having the substantially the same dimensions. In an alternative embodiment, some or all of the beams can be made smaller than the desired thickness of the mat and can be protected on their top and bottom surfaces by elongated members of boards or other structural components. These beams are typically made of lower cost materials having sufficient strength for use in the mat but that may not have sufficient ruggedness for the intended use of the mat. In this arrangement, the protective members and components are selected to provide better impact and abrasion resistance than the smaller beans such that the strength of the beams can be obtained with mat surfaces that are more resistant to the movement and placement of equipment across or onto the mat.

In a preferred embodiment, the beams are made of wood with oak or other hardwoods being preferred. For the embodiments where the upper and lower surfaces are protected by boards or other elongated members or components, the beams can be made of pine or other softwoods and the boards can be made of oak or other hardwoods, plastics, elastomers or even metal. The beams and outer boards can each be made of materials that are not wood if desired. Accordingly, the invention provides many different materials and combinations that can be used for different applications.

When the longitudinal beams are made of non-wood materials of metals, plastics or elastomers or combinations thereof, timber resources are conserved rather than being harvested to provide the long length beans for construction of the mats. It is possible to use wood only for the outer side beams with a support structure providing the remaining width of the mat. For the arrangements where the beams are of smaller dimensions than the thickness of the mat, further conservation of wood resources is achieved with the inner beams protected by upper, lower or upper and lower layers of elongated materials of any of the materials mentioned. This is particularly advantageous when the smaller beams are made of pine or other softwoods with the upper and/or lower layers of one or more boards, plates or other elongated members being made of a more durable material to protect the softwood beams that are used in the core of the mat.

And other variations are possible. The side beams can be made of a plastic, elastomeric or metal materials. These are generally rectangular in cross section and have a height that is the same as the overall thickness of the mat.

When the smaller beams in the core are protected by the upper and lower layers of other boards the working top and bottom surfaces of the mat are configured to be substantially uniform. In one arrangement, the top or bottom surfaces of the mat includes the top or bottom surfaces of the side beams and of the boards that protect the core beams. And in other arrangements, all beams can be of the same height with the upper and lower layers of boards covering all beams. In this arrangement, the top and bottom surfaces of the mat are the top and bottom surfaces of the protective boards.

A preferred embodiment uses fiberglass reinforced thermosetting resins, generally in the form of a pultrusion, for the side beams, all internal beams or the support structure, and for the elongated members essentially eliminates the use of any wood in the mats. This further conserves timber resources.

The use of a non-wood core or support structure enables that component to be reused in the event that the side beams or elongated members become damaged or experience deterioration due to use and exposure to harsh environmental conditions. By being made of more robust and environmentally resistant materials, it is possible to disconnect the joining rods to take apart the mats and remove the damaged side beams or elongated members, and then add new components to the structure to form a new mat. This also reduces the demand for wood beams or elongated members in particular by 50 to as much as 100%.

The mats of the invention typically include a plurality of longitudinal beams having top, side and bottom surfaces, with the beams having width and height dimensions of between 6×6 inches and 24×24 inches and a length of at least 4 feet and typically between 10 and 60 feet. Preferably the lengths of the beams are in the range of 20 to 40 feet and preferably 30 to 40 feet as these length mats are easier to transport and ship compared to longer mats. Other dimensions that are typically used for the side beams are 8×8, 10×10, 12×12, 14×14 and 16×16 although a skilled artisan can select other dimensions as desired.

Typically, the widths and heights of the beams are of the same dimension so that the beams have a square cross-section. Alternatively, for certain designs, the beams may be rectangular in cross section, with the width being about twice the dimension of the height or vice versa. Other typical dimensions are 6×12, 6×18, 8×10, 8×12, 12×14, 12×16, 12×24, and 18×24. These rectangular beams may be connected to the support structure with the longer side as the height or with the longer side as the width, depending upon the desired use of the mat. Using the longer side as the width is generally preferred for interlocking mat arrangements.

The beams are typically made of any type of wood with oak being the most preferred. They may also be made of engineered wood or lumber since that will be easier to make long lengths without having to obtain one piece virgin wood lengths. Additionally a layered veneer laminate can also be used for these members or beams. It is expected that the cost for that material would be about the same as the price for oak thus making it an attractive alternative.

Engineered lumber (or engineered wood) includes a range of derivative wood products which are manufactured by binding or fixing the strands, particles, fibers, or veneers or boards of wood, together with adhesives, or other methods of fixation to form wood composite materials. These materials provide the surprising benefit of repeatable consistency of the required sizes, the ability to mix different wood species to arrive at the final product, and exceptional properties generally exceeding what is provided from monolithic boards.

There are three types of engineered wood that can be used in the present invention:

parallel strand laminate (PSL), which is a beam that can be manufactured up to about 12×12 inches in any length due to the production of the beam by a continuous process;

layered stand laminate (LSL), which is a billet that can be made at thicknesses of from about 1" to 4", in widths from about 2 inches to 54", and in lengths of about 8 feet to 64 feet; and layered veneer laminate (LVL) which is also a billet that can be made up to about 4 feet square by any length.

Alternatively, the beams may be made of a fiberglass reinforced thermosetting plastic material such as fiberglass reinforced polyester or epoxy resins. These materials may be pultruded into a solid form or preferably as a rectangular or square tube. If desired, hollow tubes can be filled with any one of a variety of materials to contribute to the overall strength or compression resistance of the tube. Typically, crumb rubber, recycled tires or other plastic or elastomeric materials, sand, crushed rock or polyurethane foam may be provided inside the tube either before or after attachment to the support structure. A polyurethane foam is preferred for this purpose as it can be injected in a liquid form after the pultrusion is attached to the support structure. For stronger or heavier filler, the joining rods may be initially placed into the beam so that the filler does not block the insertion of the rods when joining the side beams to the support structure. Additionally, a metal or pultruded plastic tubular sleeve can be provided in the beams at the locations where the rods are to be inserted, so that the rod has an opening that remains after the filler is placed into the beams.

While the beams are typically made of wood, as noted other materials may instead be used. When the beams are made of metal, steel is typically used as that material is readily available and of low-cost. Although not necessary for most applications, the beams can instead be made of a more corrosion resistant material such as stainless steel, copper, bronze, or other alloys. When carbon steel is used, however, the corrosion resistance can be enhanced by painting or coating the structure so that it would be more resistant to moisture. Also, steel can be galvanized or provided with another type of protective coating so that it would have a lower tendency to rust when contacted by moisture. It is preferred that the metal be weldable to facilitate construction of the beams.

Aluminum or titanium can also be used for the beams in specialty applications. All of these materials generally have higher cost than steel and some present greater difficulties during welding or brazing.

The metal beams are typically provided as square or rectangular tubular structures or as a plurality of plates. These members can be prepared in the desired shape and configuration by welding smaller shapes or segments together.

Alternatively, the beams may be made of a fiberglass reinforced thermosetting plastic material resin, which is typically a polyester or epoxy resin. The components of the structure may be pultruded in the form of a rectangular or square tube which may be hollow or filled with other materials depending on the overall weight and compressibility desired for the construction.

The plastic or elastomeric materials can be used either as solid rectangular structures or as layers. Depending upon the anticipated service and conditions to be experienced, different combinations of beam materials can be used. Thus, the invention provides a wide range of different beam materials and material combinations that can be selected for any particular end use or service requirement for the mat.

The mat must also provide sufficient load bearing capacity: a fully supported mat (one that is properly installed on a suitable prepared ground surface) must be able to withstand a 10 ton load, spread over a 12 inch diameter surface without degradation of mat properties or permanent deformation of the mat. The support structure would have a crush resistance of between about 500 and psi to possibly as much as 1000 psi depending upon the application and when properly installed on a suitably prepared ground surface. This provides resistance against compression as large vehicles or equipment move over or are placed upon the mat.

A plurality of joining members are used to secure the beams together. These joining rods are typically large rods or carriage bolts that include threaded ends to receive nuts that when assembled will hold the components together. These rods are spaced about 3 to 6 feet apart depending upon the size of the mat. These rods or carriage bolts are typically made of a high strength steel.

A wide variety of lifting elements can be provided. Typically, the lifting element can include D-shaped members, O-shaped members, U-shaped members, eyelets, hooks, circular or polygonal rings, chains, or cables. These elements generally have a unitary structure that can provide the necessary strength and versatility in allowing the mats to be certified for overhead lifting to facilitate pick up, delivery, installation and reclamation of the mats. Each lifting element has a strength rating of from ½ ton to 12 tons depending upon the size of the mat.

All of the elements have a component that includes a loop portion that is generally an opening or open area in the lifting element that can be grasped by a hook or other member of a crane or similar lifting device. The elements also include a further securement portion, again in the form of an opening or open area that allows the lifting element to receive a joining rod therethrough so that the lifting element is securely attached to the mat.

The number of lifting elements can vary based on the size of the mat. At least one lifting element is provided on each of the top and bottom surfaces of the mat when symmetrical mats having the same top and bottom surfaces are provided. It is also possible to have two lifting elements in the center of the mat near each end as shown in FIG. 1. Greater numbers of lifting elements can be used with 4 or even 8 or 12 lifting elements on each surface of the mat. These can be arranged symmetrically in the mat surface to facilitate access by the lifting device.

The lifting elements are located in recesses which can be provided between adjacent beams or if desired, within the beams. As noted, the recesses can be arranged horizontally and parallel to the working surface of the mat, or vertically and perpendicular to the working surface of the mat. The specific arrangement is determined based on the type of lifting element that is to be used. Additionally, the recesses can be provided in adjacent beams while also located in or over the spacing between the beams.

In the most preferred arrangement the recesses are rectangular in configuration and shape but other configurations and shapes can be used. For example, sloped walls of the recess can be provided to create a V shape for the vertical embodiment while the horizontal embodiment can vary based on the shape of the support plate and can be round, oval or other polygonal shapes other than rectangular or square.

To prevent movement of the lifting element in the horizontal embodiment, the support plate can include a number of openings for nails, bolts or screws to more firmly attach the lifting element to the mat. The support plate can include 2, 3, 4 or more openings depending upon the size of the mat and lifting element. These help prevent any movement of the lifting element during movement of the mat except of course of the loop member.

The preferred embodiments for the lifting elements include a D- or O-shaped member that can pivot from a horizontal position, where it can be stored beneath the working surface of the mat, to a lifting position where the D- or O-shaped member is exposed for grasping by a hook member of a crane or other equipment. Other rings or plate members that have arcuate ends or edges and that include the appropriate opening or openings can be used.

Other suitable lifting elements includes chains one end of which is secured or attached to a joining rod and the other end of which includes a chain link or other loop portion for engaging a crane hook for lifting of the mat. The chain is retained in the recess when in the storage position. The chain is configured of steel having sufficient strength to be able to lift the entire mat without bending or breaking. Also, the links at either end of the chain can be securely attached to the joining rod when the mat is assembled.

In a preferred arrangement, only one end of the chain is permanently secured to the joining rod, while the other is attached by a conventional connectable link. Thus, after the mat is moved into position, the chain can be disconnected and stored inside support structure so that personnel working on the mat will not trip over the chain.

Alternatively, if a removable chain is desired, such as may be supplied with the equipment used to move the mats, the chain can be provided with a connectable link on each end so that the workers can attach each end of the chain to the joining rod when the mat is to be moved. After the mat is installed, however, the chain can be removed from the joining rod and reused for moving or installing other mats. This again provides greater safety for workers as the chains are not present on the surface of the mat during use.

For additional safety, the size of the opening that receives the chain is reduced compared to mats of the prior art. As the opening provided for connecting the chain is much smaller than the previous opening or cut away beam that exposed the joining rod, personnel who are working or conducting operations upon the mat have a much lower chance of stepping into hole.

Instead of a chain, a suitable cable can be provided. This is often constructed of metal strands for greatest strength. Also, when cables or chains are to be used, they should have at least three drop forged clamps. Cable can be new ¾ inch steel core, extra improved plow (EIPS), right regular lay wire rope, having a minimum breaking strength of over 29 tons. Chains should be ⅜" high test chain, having a working load limit of 5400 lbs. and a minimum breaking strength of 16,200 lbs. with ⅜ inch double clevis links, in order to provide a safe working load limit of about 5400 lbs.

Figure 2:
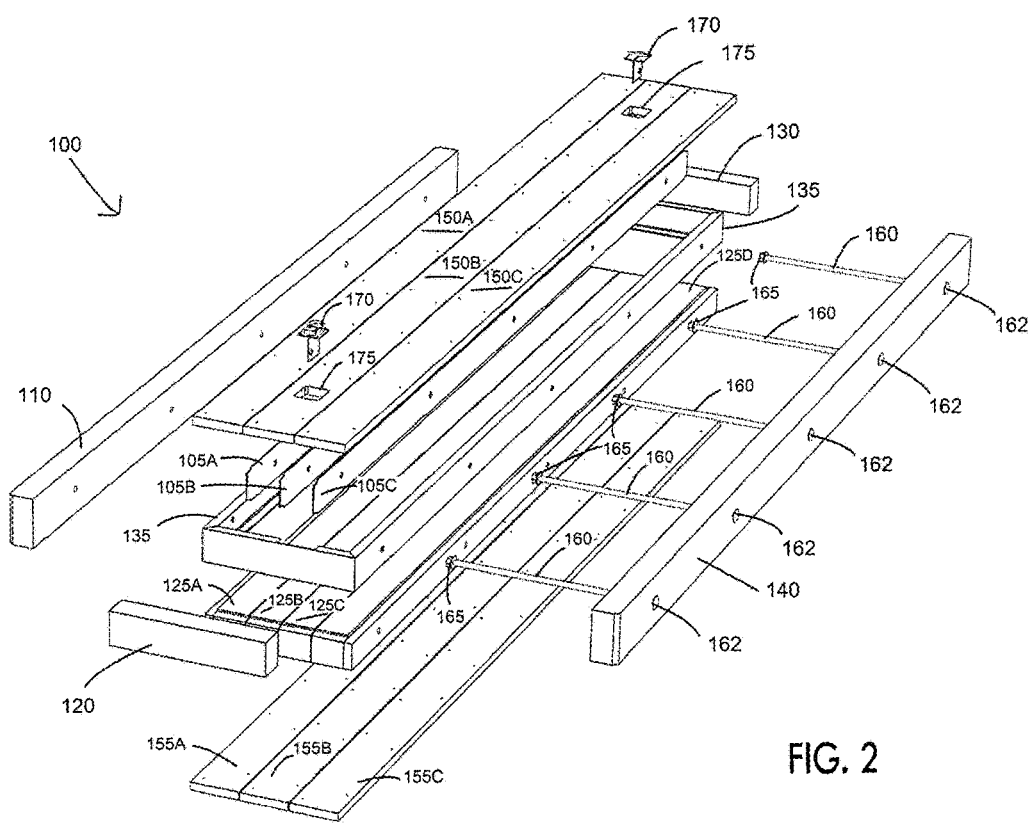
FIG. 2 is an exploded view of the mat of FIG. 1 to illustrate the various components present therein.

Turning now to the drawings, FIGS. 1 and 2 illustrate a crane mat 100 in accordance with a first embodiment of the present invention. For this embodiment, the crane mat includes side beams 110, 140 and end beams 120, 130 each made of oak or other hardwood, and four internal beams 125A, B, C, D each made of softwood such as pine timbers to reduce the overall cost of the mat. Four internal pine timbers are illustrated but the number can vary depending upon the size of the mat. As these pine timbers are not as abrasion and abuse resistance as other materials or components, they are protected on all sides by being placed in a frame 135.

The metal frame 135 is typically made of steel but which also can be made of aluminum or other metals. This frame is generally rectangular and includes flange portions on the upper and lower sides to help maintain the internal components therein. Generally, the frame members are configured as a C-shaped beam with the open side of the C facing into the core and with the flat side facing the side beams to facilitate attachment thereto. It is also possible for these members to be flat plates or even I-beams. The end and side beams can be configured for attachment to the frame members without leaving substantial amounts of open space.

The top and bottom surfaces or the pine timbers are protected one or more different elongated members, shown in FIGS. 1-2 as upper elongated boards 150A, B, C and lower elongated members 155A, B, C which are placed on the respective upper and lower surfaces of the pine timbers. The pine timbers are configured to be shorter than the longitudinal oak beams to provide space for the upper and lower surfaces of the pine timbers to receive the elongated members and form relatively flat upper and lower surfaces of the mat. The elongated members and more durable than the pine timbers and are typically made of oak or other hardwoods, plastic or elastomeric members or even metal sheets or plates. And instead of multiple elongated members, a single plate or sheet of steel, wood, plastic or elastomeric material can be used depending upon the size of the mat and the service life performance needed.

The mat is strengthened by the addition of steel or metal plates 105A, B, C which are placed between each adjacent pine timbers as well as between the oak beams and the adjacent pine timbers. These are needed for certain applications but they may be considered as optional as the present invention is also operable without these plates.

The two side beams 110, 140 which are made of white oak have dimensions of about 12×12 inches and a length of approximately 16 feet. The core of the mat is made primarily of the frame 135 and pine timbers, the latter of which have dimensions of approximately 12 inches wide and 8 inches high. The steel "C" beams of the frame have a height of about 8 inches. The frame and pine timbers are located adjacent the center of the height of the side beams such the side beams extend approximately 1 to 2 inches above and 1 to 2 inches below the frame and pine timbers. To prepare uniformly flat upper and lower surfaces of the mat, elongated boards 150A, B, C and 155 A, B, C, each of which is approximately 1 to 2 inches thick, 8 inches wide and 16 inches long, are provided above and below the pine timbers as shown. The boards can be made of wood, engineered lumber, plastic or recycle materials. The oak beams and boards thus protect the pine timbers from abuse while reducing the cost of the mat due to the substitution of the pine timbers for oak timbers. And when these elongated boards are spaced apart, channels 152 are formed between them which allow water to drawing from the mat during use.

The frame is protected at the forward and rearward ends of the mat by end beams 120, 130, but as these ends are not usually subjected to great abuse, the inclusion of these beams are optional. When the end beams are not used the steel frame is configured to form the ends of the mat. Alternatively, if desired, bumper members as disclosed in the prior applications that are incorporated by reference herein can be provided on the forward and rearward ends of the mat to provide further protection of the ends of those pine timbers.

The side beams, pine timbers and when used the steel plates are joined together by joining rods 160 which extend across the width of the mat. Typically, rods 480 are carriage bolts having a head 162 that engages an opening on one of the side beams and a threaded end and nut 165 on the other end of the bolt on an opening in the other side beam. Preferably, the ends of the longitudinal members are recessed into the mat or are provided with a low profile that does not protrude significantly from the mat. A number of joining rods or bolts are used spaced every 3 to 6 feet of length of the mat. The bolts pass through each of the beams and timbers and when used the plates and are secured in placed by the washer and nut arrangement 165. The upper and lower boards 150 are either nailed or bolted to the pine timbers.

To facilitate lifting of the mats, a lifting element 170 according to the invention is provided. This element is best shown in FIGS. 3-6. A D-shaped ring 172 is preferably provided that is pivotally attached to a steel support plate 174 by way of a U-shaped channel member 176 that is welded 178 to the steel support plate 174 to provide space to facilitate the pivoting movement of the ring 172. The lifting element 170 also includes a base plate 182 that is arranged perpendicular to the support plate 174 and that is welded 184 thereto. The base plate includes an aperture 186 that receives the support rod 160 to secure the lifting element to the mat. This lifting element is provided in a recess 175 that is present in the center board 150 and that extends onto the upper sides of the pine timbers 125 while the base plate extends into the spacing between those pine timbers to reach the point where the support rod 160 passes through the pine timbers. The plate is accommodated in the pine timbers by the recess 175 into which the plate can be seated. To further prevent movement of the lifting element during use, four holes 188 are provided in the support plate to receive nails or screws that secure the support plate to the timbers. This provides a very secure connection that allows overhead lifting of the mat for installation or removal as well as to facilitate loading or unloading of the mats on a truck or train bed. It also prevents wear and abrasion compared to lifting elements that move within the mat as only the D-shaped ring needs to be removed from the recess to be operated.

The D-shaped ring of lifting element 170 is provided in an opening or recess 175 in the center board 150B in such a way that when not used to lift the mat, the D-shaped ring lies flat in the opening so as to not hinder movement of personnel over the mat. This is shown in phantom in FIG. 3. And while the two lifting elements are shown on the upper surface of the mat, it is advantageous to also provide the same arrangement on the lower surface of the mat. Furthermore, the number and precise location of the lifting elements is not critical but can be selected by a skilled artisan depending upon the overall size and weight of the mat.

Figure 7:
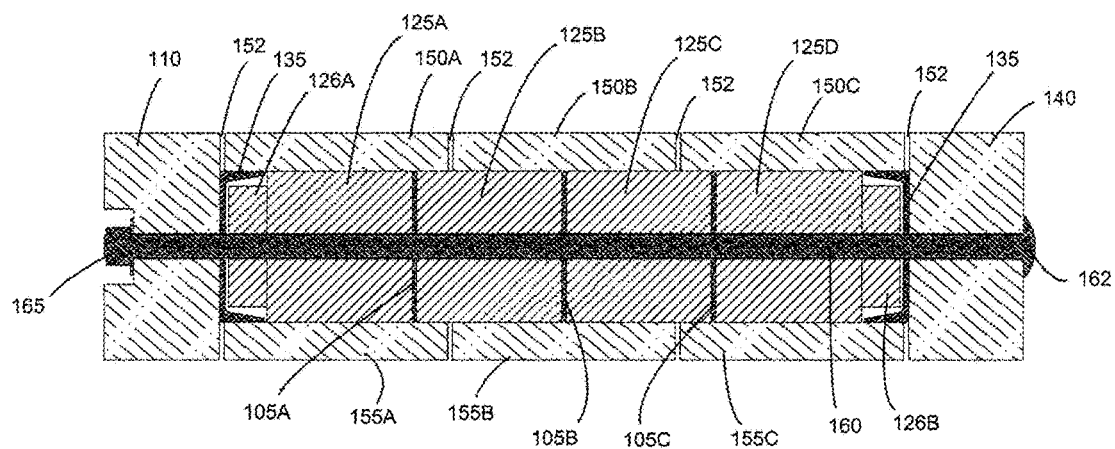
FIG. 7 is a cross sectional view taken through the crane mat of FIG. 1 along one of the longitudinal members to show the arrangement of the internal and external members.

FIG. 7 illustrates a cross-section of the mat to show how the components are joined together. Side beams 110, 140 are joined to frame 135 and pine timbers 125A, B, C and D. Frame 135 is made of the preferred C-shaped members having upper and lower flanges that assist in confining the internal wood members in the support core. The internal members includes smaller boards 126A, 126B which may also be made of pine that fit within the space between the flanges of the frame members 135. The pine timbers on the front and rear ends of the mat have chamfered ends while the outermost pine timbers have a chamfered outermost edge in order to provide a shorter height so that they can fit into the C-shaped members of the frame. The remaining upper surfaces of the pine members, the upper surfaces of the intermediate steel plates and the flanges of the frame members for, substantially flat upper and lower surfaces of the support core. This facilitates attachment of the protective elongated members to the core structure.

The use of a small recess for the D-shaped ring also minimizes the amount of dirt or other debris that can enter the recess. And as the ring occupies a significant portion of the recess it is easy to grab the ring to move it to a lifting position.

Generally, one lifting element is located on a lateral rod at the center of the mat nearest one end and another lifting element is located on a lateral rod at the center of the mat nearest the opposite end. It is also possible to utilize four lifting elements, two spaced lifting elements on the lateral rod nearest the first end of the mat and two other spaced lifting elements located on a lateral rod nearest the opposite end of the mat. These can be provided between the pine timbers or between the longitudinal oak beams and pine timbers. While four lifting elements are sufficient in most cases, higher numbers can be used if desired. For large mats 6, 8 or even 12 lifting elements can be used to provide versatility in movement and manipulation of the mats. Preferably, the lifting elements are arranged and located symmetrically on the working surface or surfaces of the mat.

Figure 8:
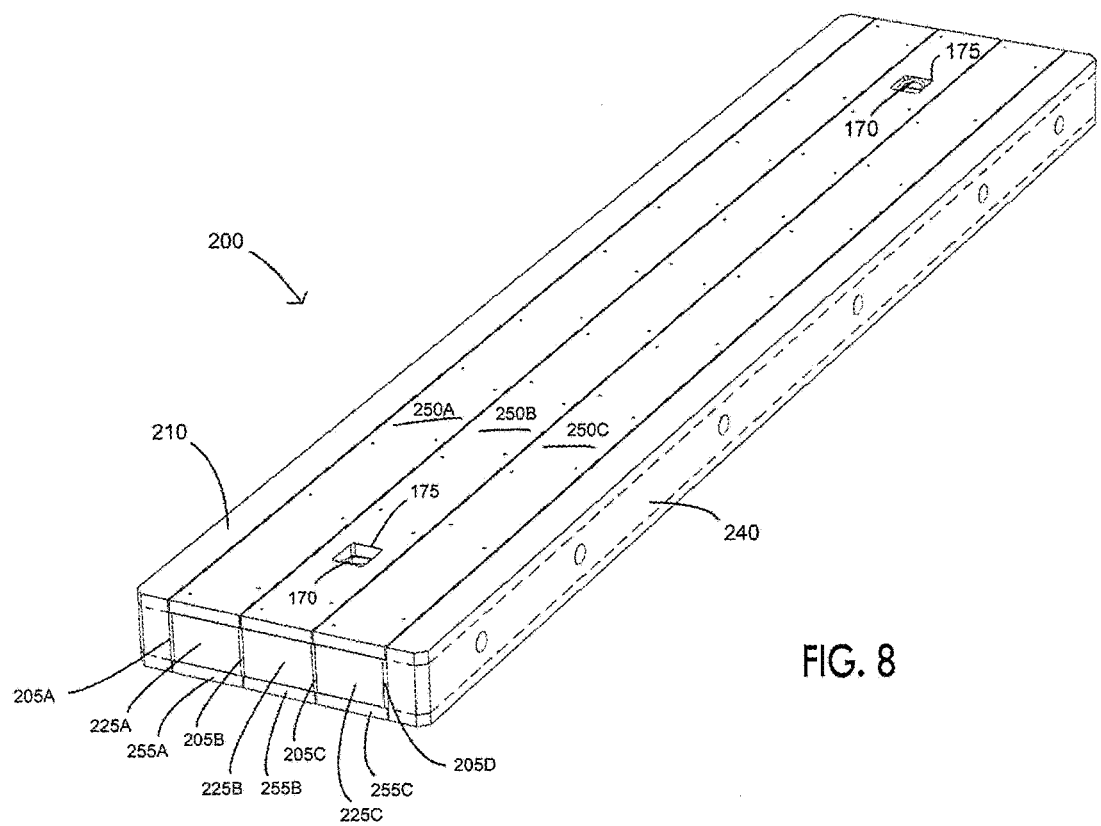
FIG. 8 is a perspective view of a second embodiment of a crane mat having new lifting elements according to the present invention.
Figure 9:
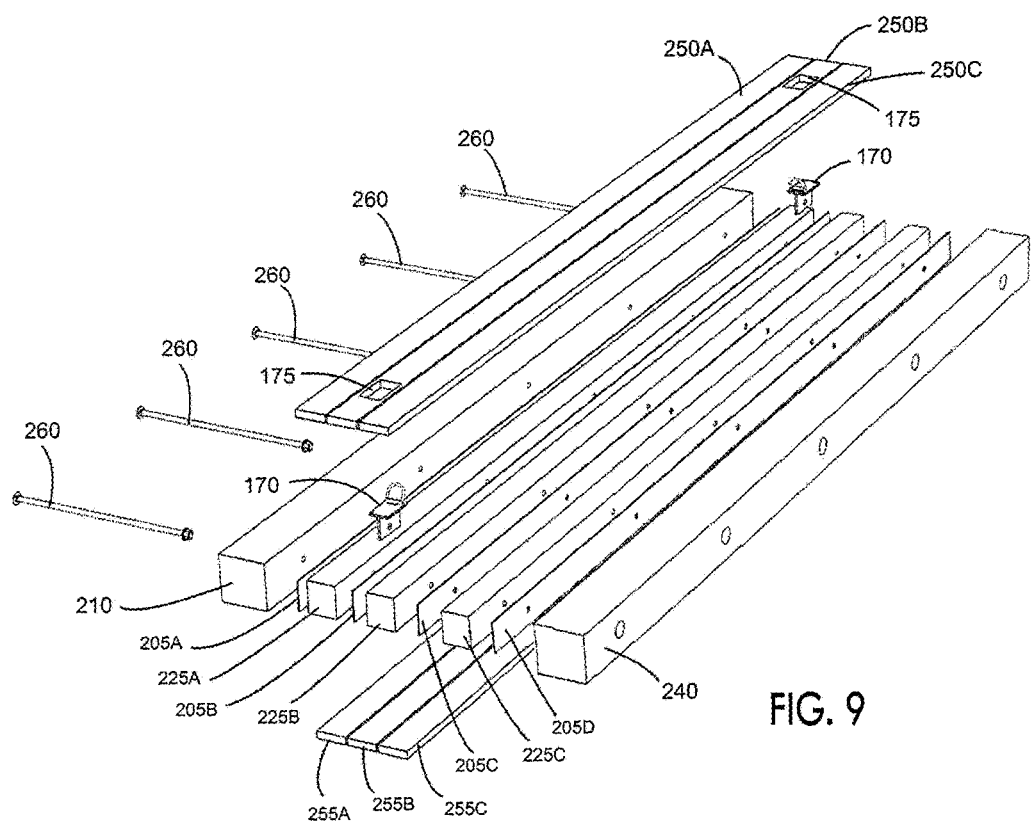
FIG. 9 is an exploded view of the crane mat of FIG. 8 to illustrate the various components present therein.

FIGS. 8-9 illustrates a variation of the crane mat of the previous embodiment although the same lifting element 170 is used as in FIGS. 1-2. Crane mat 200 has three pine timbers 125A, B, C that have upper and lower surfaces protected by elongated boards 250A, B, C and 255 A, B, C. Boards 250 are the same as boards 150 in FIGS. 5-7 and are smaller in width than pine beams 220, 230. Boards 255 have the same width as pine beams 210, 240. While the upper and lower surfaces of the mat are formed by the upper and lower surfaces of the boards, this example illustrates that the width of the boards that are used can vary as desired. And as previously noted, a single plate or sheet can be used instead of multiple boards if desired. The use of multiple boards however is preferred because if a particular board is damaged it can be replaced rather than having to replace an entire unitary sheet or plate that covers the entire top or bottom surface of the mat. In some situations, however, a plate of steel or unitary plastic or elastomeric material layer can provide additional advantages when covering the entire surface on the top or bottom of the mat.

As a steel frame is not used in this embodiment, the ends of the mat include the exposed ends of the pine timbers and steel plates. As noted, in certain embodiments, these ends of the mat do not need to be protected as they experience less abuse that the sides and top and bottom surfaces of the mats. The pine timbers and steel plates 205A, B, C are joined together by the rod members 260 as in FIGS. 1-2.

FIGS. 8-9 illustrate another variation of the invention. Instead of using side beams 210, 240 that have a greater height than the pine timbers, the side beams can have the same height as the pine timbers. This is shown by the dotted lines on beams 210, 240. With this arrangement, additional protective boards can be provided on the top and bottom surfaces of the side beams. This allows the protective boards to be removed from those surfaces and replaced so that the service life of the crane mat can be extended. The boards would be sized as shown above and below the dotted lines on the side beams. This arrangement may be useful when the side beams are made of other than wood as the upper and lower surfaces of the side beams can be protected by oak boards or other more rugged materials. This arrangement also allows pine beams to be used as side beams.

Figure 10:
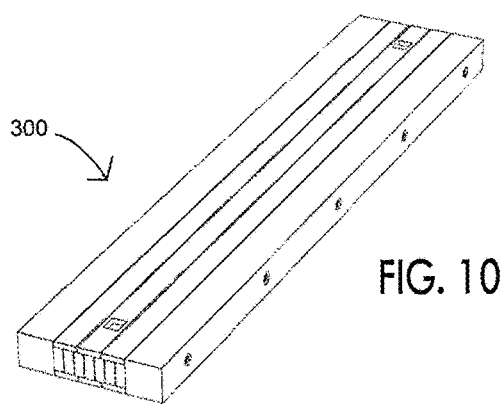
FIG. 10 is a perspective view of a third embodiment of a crane mat having new lifting elements according to the present invention.
Figure 11:
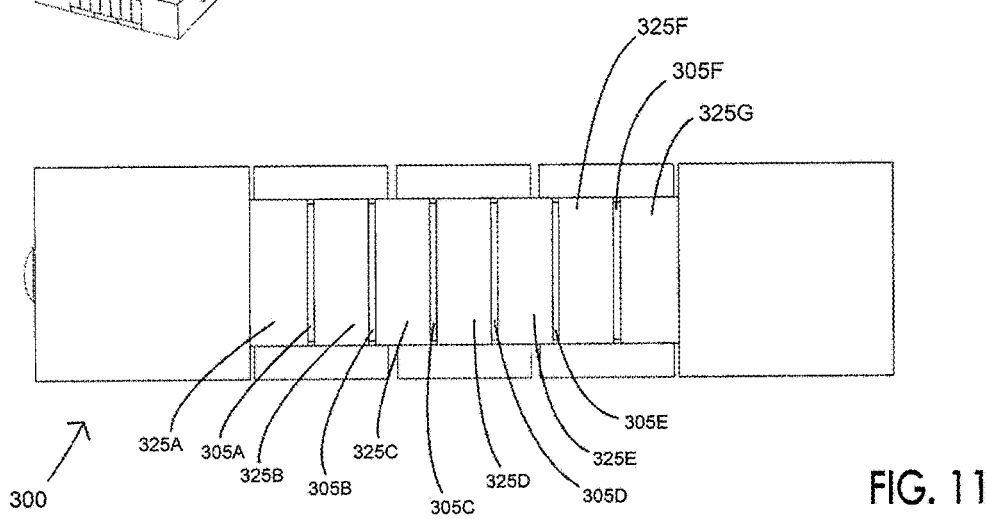
FIG. 11 is an end view of the crane mat of FIG. 10.

FIGS. 10-11 illustrate another variation of the crane mat of the previous embodiment with the only change being the use of smaller pine timbers in the core. Instead of using 2 or 3 pine timbers of larger size, the crane mat 300 uses pine boards of smaller dimensions, such as 2 by 8 inches, instead of 6 by 8 or 8 by 8 inches. This results in seven pine boards 325A, B, C, D, E, F, G and six intermediate steel plates 305A, B, C, D, E, F. Using a greater number of steel plates with the reduced width of the pine boards provides a reinforced structure that does a much better job of withstanding loads on the mat. The steel plates are $3/8$" thick in this embodiment but they can vary from $1/4$" to $1/2$" in other embodiments.

Figure 12:
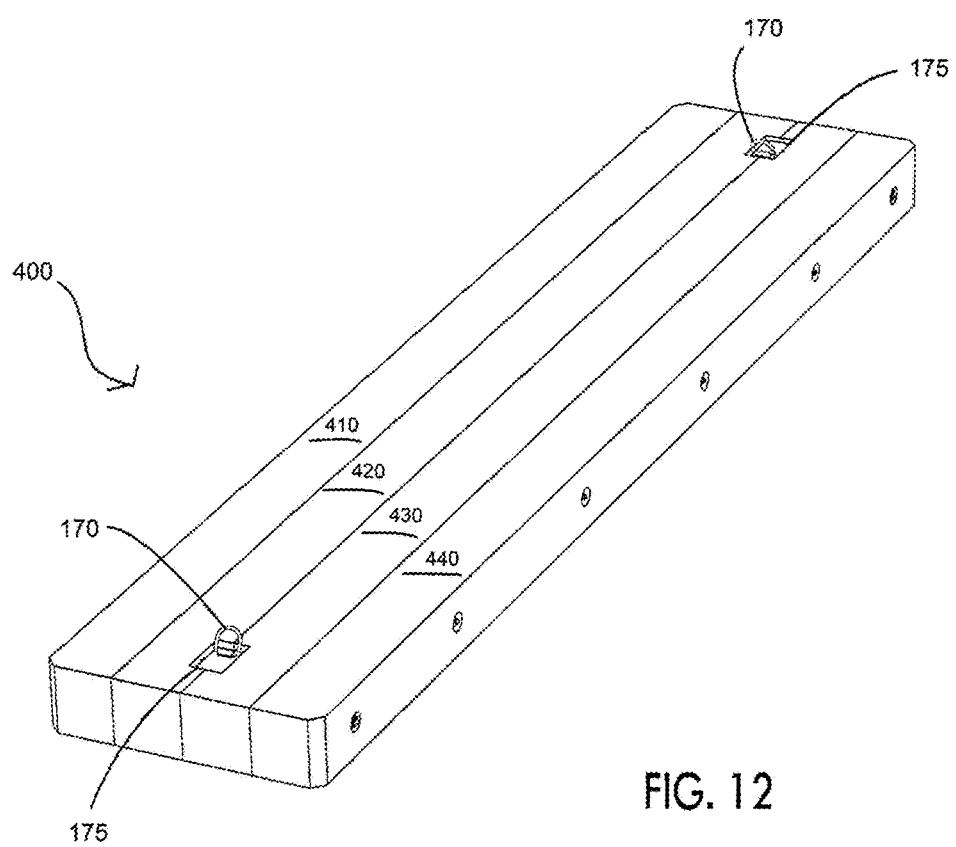
FIG. 12 is a perspective view of a fourth embodiment of a crane mat having new lifting elements according to the present invention.
Figure 13:
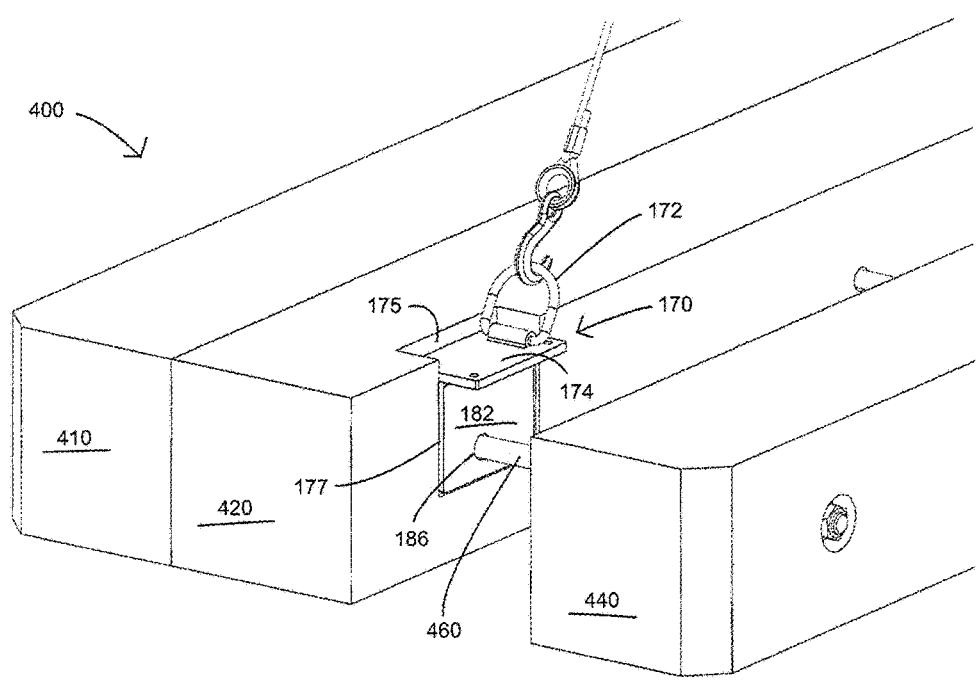
FIG. 13 is an expanded view of the front end of the crane mat of FIG. 12 with one of the longitudinal members removed to illustrate the connection of the lifting element.
Figure 14:
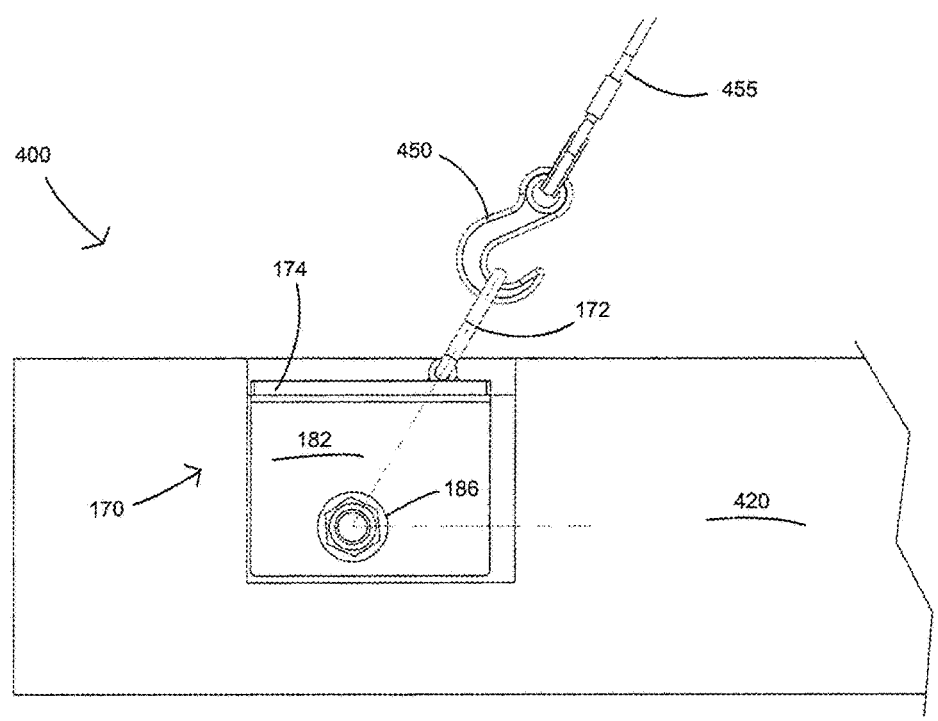
FIG. 14 is a cross sectional view taken through the crane mat of FIG. 12 to illustrate the position of the lifting element in use.

FIGS. 12-14 illustrates yet another variation of the invention. In these Figures, crane mat 400 is made only of longitudinal beams, typically of oak although other durable materials such as thermoplastics or thermosetting plastics (hollow or filled), elastomers or even metal tubes can be used. The same lifting element 170 is used as in the preceding Figures. In FIGS. 12-14, mat 400 has four longitudinal beams 410, 420, 430, 440. Unlike the other embodiments, there are no intermediate steel plates, no protective members nor is there a metal frame. The beams are joined in the same manner as in the other figures by rod members or carriage bolts that pass through apertures that extend through the width of the beams.

In the preceding Figures, the bottom surface of the mat is not shown, but the mat is preferably made with the same structure on both surfaces so that either one can be used as the upper surface of the mat that is to receive equipment or vehicles thereon. While this facilitates installation in that there is no requirement for placement of the mat in a particular orientation, it also allows the installer to select the surface of the mat that is in better condition to be used as the upper surface of the mat.

FIG. 13 illustrates the crane mat 400 with longitudinal beam 430 removed so that the position and placement of the lifting element can be shown. The lower vertical plate of the lifting element 182 is placed in a vertical recess 177 between beams 420 and 430. Support plate 174 is located in recess 175 and is secured to the mat by engaging rod member 460 which passes through aperture 186 as well as be being nailed or screwed to the beams though the apertures on the support plate 174.

The mat is provided with at least two lifting elements each located in an opening between the innermost beams when an even number of beams are use or between the innermost bean and an adjacent beam when an odd number of beams are used. Alternatively, for wider mats, two spaced lifting elements can be provided at each end of the mat.

FIGS. 13-14 illustrate the lifting element 170 in use. The hook 450 which is connected to a high strength chain of a lifting device engages D-shaped ring 172. The same type of attachment is made to the lifting element on the other end of the mat. As the mat is lifted, the chain and hooks provide an angle of 60° with respect to the mat surface, with an imaginary line passing from the chain though the lifting element and through the center of the rod member that is located in hole 186. This provides the optimum arrangement for safe lifting of the mat by the lifting device. Using the same length of chain with each hook assures that the 60° angle is achieved.

It is also possible to configure the opening sidewall to support the D ring in an upright, generally upright or angled position to allow attachment of a hook to the ring without requiring separate holding of the ring by an operator or worker. This is advantageous in that the worker has two hands in which to attach the hook rather than using one hand to hold the ring in position while using the other hand to attach the hook. There are a number of ways to facilitate this maintenance of position. The D ring can lie against the opening and be generally upright or at least at an angle of about 45 degrees or greater and typically at 60° for optimum lifting performance. The U-shaped part that attaches the D ring to the support plate can also be configured with a structure thereon that assists in maintaining the ring at the desired angle for engagement by a hook or other lifting member. The structure can be a bump or protrusion on the U-shaped part that does not allow the ring to move past a certain angle. For example, the ring can be prevented from moving more than 120° from the storage position as this provides the 60° lifting angle. The angle has to be greater than 90° so that the weight of the ring maintains it in an upright or substantially upright position.

Figure 15:
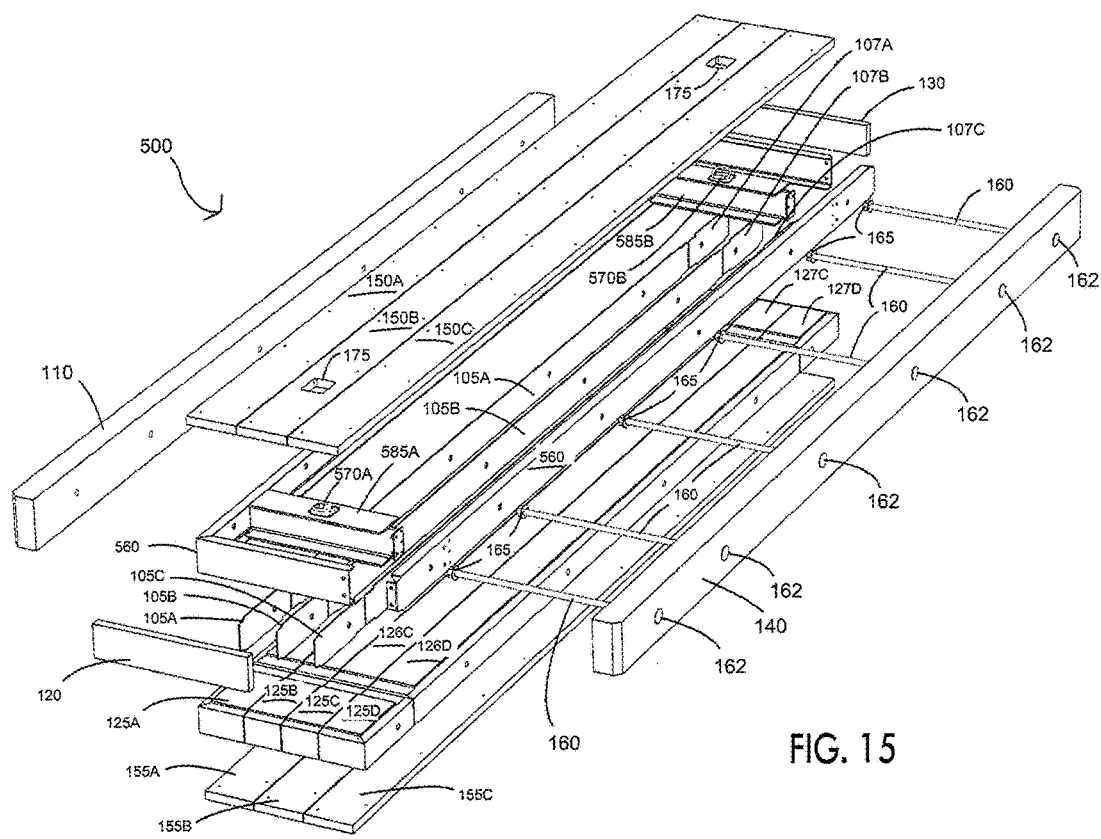
FIG. 15 is an exploded view of a fifth embodiment of a crane mat having an internal frame to illustrate the various components present therein.
Figure 16:
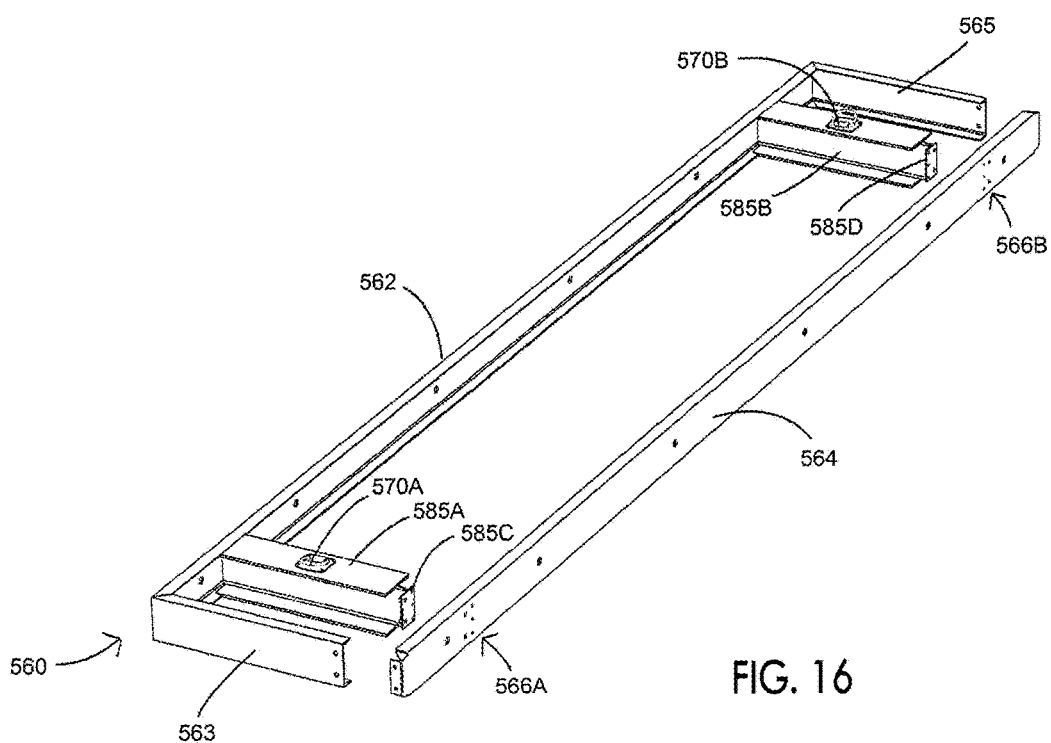
FIG. 16 is an exploded view of the frame member of the crane mat of FIG. 15 to illustrate the attachment of the cross members.

FIGS. 15-16 illustrate another embodiment of the invention. This crane mat 500 is similar to that of FIGS. 1-2 such that the same components have the same element numbers. Instead of having an open frame, however, the frame 560 of FIGS. 15-16 includes cross members 585A, 585B. These cross members are placed near the front and rear ends of the mat and are bolted to the side members of frame 560. In fact, all frame members can be bolted together to facilitate construction of the mat.

Lifting elements 570 A, B are provided and are configured in a similar manner to lifting element 170 of FIGS. 1-2, with the exception of the omission of base plate 182. Instead, support plate 174 is welded to an upper surface of each cross member so that it is securely attached to the mat. As above, the D ring 172 of the lifting element resides in a notch or recess 175 that is present in protective board 150B. As in the other embodiments, this allows the upper surface of D-ring to be flush with or slightly below the surface of the mat while blocking the recess 175 so that workers will not step into the hole or trip over the D ring when it is not in use. The lifting element 570 also allows the mat to have to have certified overhead lifting capabilities.

The pine beams 125A, B, C, D in this embodiment are shorter than in the previous embodiment and extend between the cross members 585A, 585B. The same is true of steel plates 105A, B, C. The space between the cross members in the end plates of the frame can be left open if desired, but in a preferred embodiment are filled with boards and plates in the same arrangement as between the cross members. In the front end of the frame, shorter pine timbers 126A, B, C, D and steel plates 106A, B, C are used to mimic what is present in the middle of the core structure between the cross members. These shorter pine timbers and steel plates are also connected to the mat through the lateral rod 160 that passes through the space between the cross members and frame end members. Similarly, on the opposite end of the frame, shorter pine timbers 127A, B, C, D and steel plates 107A, B, C are used to mimic what is present in the front end of the frame. These shorter pine timbers and steel plates are also connected to the mat through the lateral rod 160 that passes through the space between the cross members and frame end members.

FIG. 16 is an exploded view of frame 560 of FIG. 16. To assemble the frame, one longitudinal member 562 and one end of the end members 563, 565 and cross members 585A, B can be welded to the longitudinal member 562. The other longitudinal member and cross members 585A, 585B include side plates 585C, 585D, respectively. These plates are provided with holes 566A, 566B that align with holes on the side members of the frame so that the cross members can be attached to the frame using bolting. This is typically done after the internal beams and if used steel plates are provided in the frame between the cross members and between the cross members and frame ends, otherwise it would be difficult to insert those internal components into the frame, especially when inwardly directed "C" shaped steel members are used to make the frame. The use of bolting allows the frame and cross members to include upper and lower flanges which assist in maintaining the pine beams and steel plates in the core structure of the mat. If flange members are not provided on the frame and cross members, then the entire frame including the cross members can be welded together prior to the addition of the internal components which are then slid into the frame.

And as in the other embodiments, the materials for the various components of crane mat 500 can be made of any of the different materials specified herein. Also various combinations of materials can be used for any particular sized mat for any intended use thereof. And the elongated boards that are used to protect the core structure can be provided as separate boards or as a single plate or sheet. Multiple plates or sheets can be used for larger size mats. As noted, the material for these sheets or plates can be wood, a metal, preferably steel, a thermoplastic, a thermosetting plastic or an elastomer. When a steel plate is used the lifting element can be welded onto the steel plate or an opening can be provided in the steel plate so that the lifting element is attached as shown in the preceding embodiments.

FIGS. 17, 18A, 18B, 19A and 19B illustrate different lifting elements for use in any of the crane mats disclosed herein. Each of these lifting elements 600 is in the configuration of an eyelet. The lifting element 600 has a body 605 with a first end thereof 610 having a securement portion in the form of an opening 615 for receiving and connecting to a lateral rod and a second end 620 having a loop portion 625 that acts as grasping means for a hook or connecting element of lifting equipment to engage the loop portion for lifting and manipulation of the mat. The loop portion 625 is an aperture in the second end 620. Instead of an aperture, the loop portion can be a hook element or J- or L-shaped bar that can engage a mating connecting element on the lifting equipment.

The body 605 is typically a flat plate that preferably has rounded edges but it also can be a bent or angled member that near one end has the necessary aperture to receive the lateral rod therein for attachment to the mat, and on the opposite end includes the aperture or other loop portion. In some cases, a chain or cable can be used instead of the flat plate with the chain or cable passing around the rod and out of the aperture to be engaged by the lifting equipment. The flat plate is preferred because it is compact and requires a smaller hole than a chain or cable.

Figure 18A:
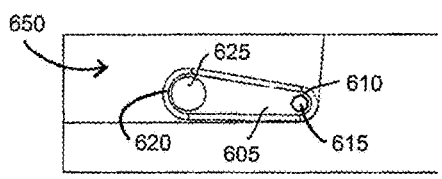
FIG. 18 includes FIGS. 18A and 18B which are a partial sectional views of the lifting element of the crane mat of FIG. 17 in operative and storage positions, respectively.
Figure 18B:
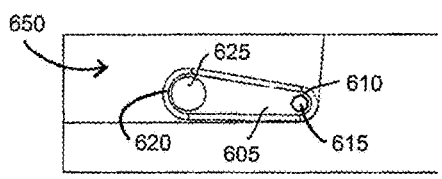

A vertical recess 650 having a flat bottom surface 655 is configured and dimensioned to hold and maintain the lifting element 600 therein in a first retracted or storage position as shown in FIG. 18B when not in use and to allow retrieval and removal of the second end 620 of the lifting element from the opening or recess 650 to a second operative position that exposes the loop portion 625 to allow grasping when the mat is to be lifted or manipulated, as shown in FIG. 18A. The opening 650 is either positioned at an end of the mat so that it is open at that end as shown or has a sufficient volume to allow a user to reach therein to grab and move the loop portion 625 from the retracted position to the operative position. And while FIG. 18B shows the lifting element well below the surface of the mat, in practice, the open space above the lifting element should be minimized so that the lifting element helps form part of the surface of the mat. This prevents tripping or stumbling by workers who step into the opening 650 when moving across the mat surface.

Figure 17:
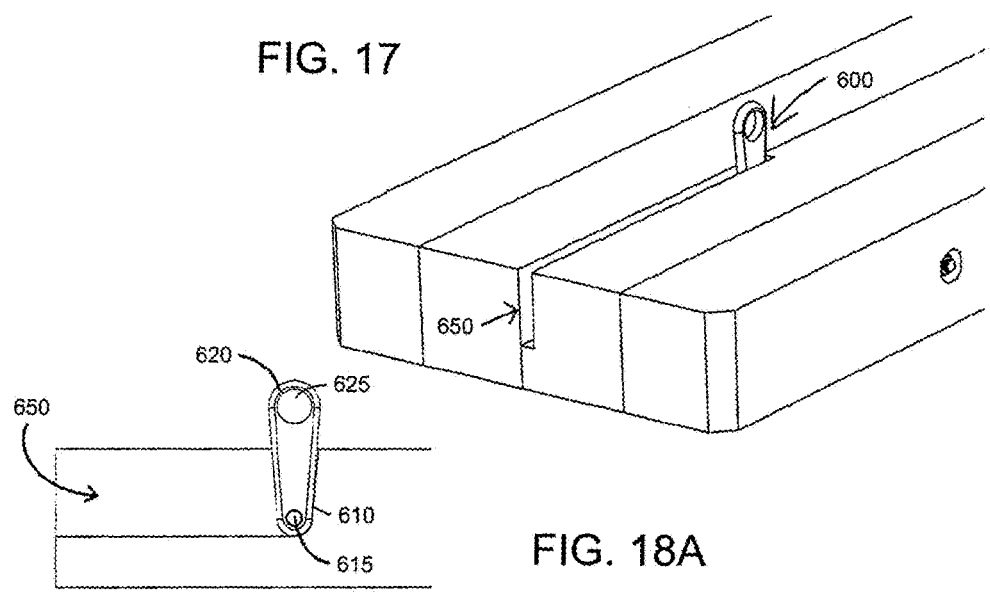
FIG. 17 is an end view of a sixth embodiment of a crane mat having new lifting elements according to the present invention.

The lifting element 600 shown in FIGS. 17 and 18A, 18B is spaced from the end of the mat by a few feet, e.g., 1 to 3 feet. To provide access to the lifting element, the opening in which the element resides is elongated so that it extends from the point where the lifting element is present all the way to the end of the mat. This provides access to the lifting element to remove it from its retracted position, which is shown in FIG. 18B, to an operative position as shown in FIG. 18A. Again, the lifting element 600 has an arcuate first end to allow the lifting element to more easily pivot about the joining rod between those positions.

And although the opening 650 is illustrated as being much longer than the length of the lifting element, it is also possible to simply widen the opening about the retracted lifting element rather than have a thinner opening that extends to the end of the mat. The configuration of the openings 650 should simply be sufficient to allow an operator to be able to reach in and grab the lifting element to raise it to its operative position. When the opening is placed further back in the mat, it is generally widened to allow the hand of the operator to reach into the opening.

FIGS. 19A and 19B illustrate a variation of the lifting element of FIGS. 17, 18A and 18B. The lifting element features are the same as in the prior Figures, but the vertical recess 660 is configured with a sloped bottom wall 665. This enables the recess to be of overall smaller size while still retaining lifting element 600 below the working surface of the mat. Also, the recess 660 does not need to extend to the end of the mat and terminates at a vertical wall 670.

A number of variations of the lifting element of the preceding Figures can also be used in the present invention. Instead of two holes separated in the plate as shown for lifting element 600, a single, larger hole can be provided in the plate. The open center plate can be used on smaller sized mats where the overall lifting element does not need to be as long as lifting element 600. It is possible to obtain a metal or steel stamping in the desired shape and thickness which will have the same outer circumference and size of lifting element 600 but without the body portion 605 between the two openings—in effect being a single larger opening.

And for certain mats, it is possible to instead use a ring that is made of a metal, preferably steel, bar of cylindrical or rectangular cross-section that is configured in the shape of a ring with the ends of the bar welded together. This ring can be shaped as shown in the prior Figures with a similar outline to the shape of those lifting elements, or it can be made as an oblong, oval, elliptical or circular ring. These non-linear shapes are preferred as they are easy to manipulate with respect to removing a portion of the ring from the slot for use when the mat is to be moved, as well as to allow the ring to fall back into the slot into the storage position after the mat is installed and in use. A shape other than circular is preferred, however, as it will more easily fit within the vertical recess 650 or 660. The shape of the ring would be selected based on the thickness and overall weight of the mat. This will also be used to determine a suitable thickness for the plate embodiment of the prior Figures or for the diameter or circumference of the cylindrical or rectangular rod that is shaped as a ring.

To avoid the lifting element damaging the wood sides of the slot or recess, the edges of a rectangular bar or plate can be rounded. Alternatively, the slot or recess can be lined with a plate preferably of metal in areas where contact by the lifting element during movement of the mat is expected. Such a construction requires additional time and labor to configure the slot or recess so that the collar embodiment is preferred. A metal collar that can be used to protect the opening in the mat from damage due to contact with the lifting element is described as element 1302 in U.S. patent application Ser. No. 15/244,614 in FIGS. 6 and 7. This collar protects against contact and abrasion from the lifting element when lifting the mat. Alternatively, other replaceable structure of metal or other materials can be used to protect the sides of the opening.

For any of the embodiments that are used with the slot of the preceding Figures, the angle of the sloped bottom wall is sufficient to allow the lifting element to fall back down under its own weight into a position where it does not protrude above the working surface of the mat. And when the lifting element is to be used for receiving a hook of a crane or other heavy equipment device, a worker can simply reach into the slot and pull up the lifting element to expose an opening or hole that the hook can engage to then move the mat.

Figures 20, 21:
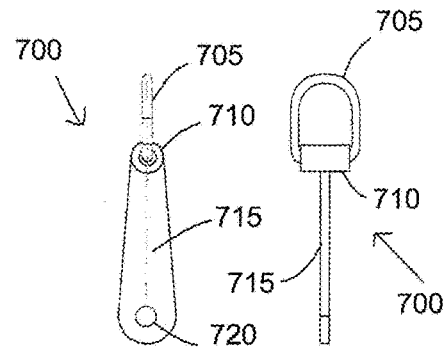
FIG. 20 is a front view of another lifting element for use in the present invention.
FIG. 21 is a side view of the lifting element of FIG. 20.

FIGS. 20-23 illustrate another lifting element 700 in the form of a T shaped member that is similar to that of FIGS. 3-6. FIG. 20 illustrates that the D ring 705 is attached to a widened, reinforced opening 710 on one end of the lifting element 700. This reinforced opening acts as a support plate for the D ring and is configured as in the other embodiments so that the D ring 705 can form a 60° angle with opening 720 when a lifting hook 755 is attached to the D ring 705. As noted herein, this angle has been found to provide ideal overhead lifting capacities. Using hooks 755 connected to each lifting element from lines that are joined at a common point achieves this arrangement, but if necessary the reinforced opening 710 can include bumps or other protruding structures on the sides so that the D-ring will stand in position to form the 60° angle.

Figure 23:
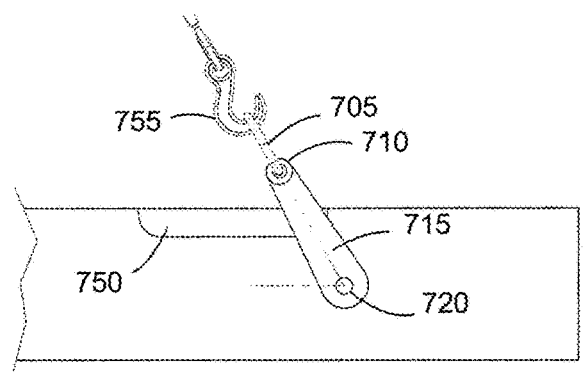
FIG. 23 is a side view of the lifting element of FIG. 20 in use.
Figure 22:
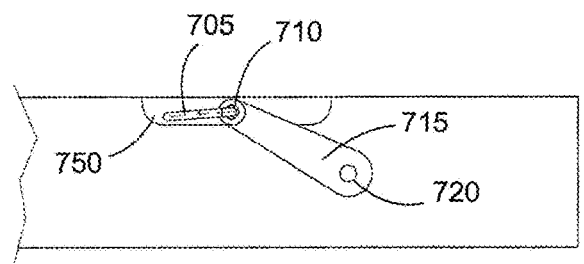
FIG. 22 is a side view of the lifting element of FIG. 20 in a storage position.

The lifting element 700 is provided in a rectangular recess 750. When the D ring 705 of the lifting element 700 is needed for use, it is raised for attachment of a hook or other lifting member thereto. For this, the D-Ring is removed from the recess 750 so that it can be located above the working surface of the mat as shown in FIG. 23 to allow attachment of the hook 755 to the D-ring. And when the D ring 705 is not being used for lifting the mat or for tying other articles to the mat, it can conveniently retracted into the recess 750 or opening in a storage position wherein the D ring substantially fills in the recess or opening. In this position, a worker or other person operating on the mat has less of a chance of stepping into the opening or recess as it is more or less filled with the lifting element. This can prevent injuries to workers moving on the mat. Also the storage of the lifting element beneath the mat surface clearly avoids workers tripping over an exposed lifting element when moving about the mat.

Figure 24:
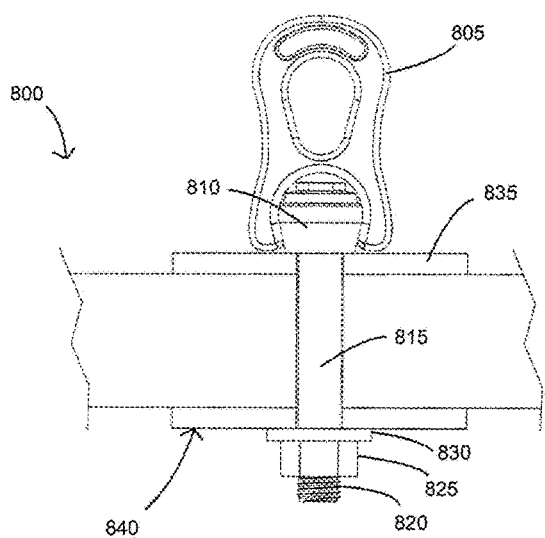
FIG. 24 is a front view of another lifting element for use in the present invention.
Figure 25:
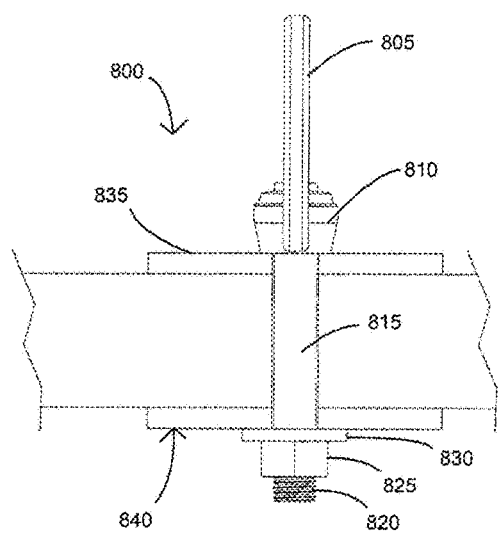
FIG. 25 is a side view of the lifting element of FIG. 24.

FIGS. 24-25 illustrate yet another lifting element 800 in the form of an "I" shaped member. This lifting element includes a specially shaped ring member 805 is securely attached to an enlarged head member 810. Typically the ring member 805 is attached to the head member 810 by a pin that passes through the head member 810. For lighter weight mats, the ring member can be configured with end legs that securely engage openings in the head member 810. For either embodiment, the ring member can pivot back and forth so that when not in use it can lay flat against a supporting surface such as the floor of a recess or opening in the mat. As in the other embodiments described herein, the ring member 805 and head member 810 would be located in a recess in the mat so that when not in use the head member 810 and ring member 805 would substantially fill in the opening. And when needed to move the mat, the ring member 805 can simply be pivoted out of the recess and above the mat surface for engagement.

The lifting element 800 has a body member 815 that passes through the entire beam of the mat construction. The opposite end of the lifting element 820 is threaded so that it can receive a nut 825 and washer 830 to secure the lifting element to the mat. The nut and threaded end of the body member are located in a recess on the opposite side of the mat so that they do not extend out of the surface on that side of the mat.

For additional securement, round, square or rectangular plates 835, 840 can be provided in contact with the beams to provide greater resistance against lifting element pull-out when the mat is being moved. These lifting elements 800 can be used alone or in combination with the other lifting elements disclosed herein depending upon the type of mat being made and the need for having such lifting elements for moving the mat or for tying articles to the mat.

Although FIGS. 24 and 25 do not show the lifting element seated in an opening or recess, it would be understood that this would be necessary for the same reasons previously mentioned and with the same configurations so that the ring element does not protrude above the working surface of the mat. Ring element 805 can be pivoted downward, i.e., to the right or left in FIG. 25, in order to be maintained in the recess. Therefore, the recess will have a height that is at least as high as head member 810, and a width that would be at least as wide as the length of ring member 805 and half the width of head member 810.

Also, plate 835 can be of a width and length that encompasses the entire floor of the opening or recess. Of course, a plate having dimensions that are smaller than the recess is also acceptable. The same is true for plate 840. The goal of plates 835 and 840 are to help distribute the load on the lifting element to the surface of the member to which it is attached as well as to more securely connect the lifting element to the mat.

And to the extent that the plates 835, 840 have smaller dimensions than the recess, it is also possible to provide a further recess or cutout below the plate so that the plate has an exposed surface that is at the same level as the floor of the lifting element recess. This will also further limit the depth of the lifting element recess needed to maintain the lifting element below the working surface of the mat.

Washer 830 is not always needed but is typically used to facilitate the attachment of the lifting element to the member of the mat. This is typically round but can be square or of other peripheral shapes. If desired, the washer can be a lock washer to offset loosening of the nut from the threaded rod.

And to the extent that the mat has upper and lower working surfaces that enable either one to be selected as the top of the mat when installed, the lifting elements can be provided on the opposite side of the mat with a reverse orientation to the ones shown in FIGS. 24 and 25. This of course would apply to any of the arrangements of lifting elements disclosed in the present application. It is often common for such mats to include both upper and lower working surfaces so that upon installation, the surface in better condition can be selected as the top or exposed surface of the mat that is used to experience worker or equipment travel or placement thereon.

The crane mats of the invention may be 2' wide to 12' wide with all mat components being square or rectangular timbers or beams/bumper members connected together by the lateral rods. Various mat thicknesses can be used from 2" to 24". And instead of single beams, boards or layers of boards can be used. In a preferred embodiment, oak or other hardwood beams can be used alone at those dimensions with the beams connected by the lateral rods although combinations of different materials can be used if desired. For any of these embodiments, at least two lifting elements are provided on the upper working surface with the base plate of each lifting element connected to one of the lateral rods. The lifting element would preferably be one like lifting elements 475 or 476 and be provided in a recess in one or more of the mat components. Intermediate steel plates can also be included between the beams if desired.

Additionally, the mats can be made of various combinations of components including frames of a metal such as steel or of a thermosetting plastic. The internal components in the frame can be beams, board or other structural shapes of wood, engineered wood, plastic or elastomeric materials. These can be of sizes that vary from width and height dimensions of about 2" by 2" to as much as 24" by 24". The interior timbers can be from 2"×2" up to 12"×12" or even 16" by 16". Generally, the various beams and mat components are square but rectangular shapes are also acceptable. Useful core thicknesses are 2", 3", 6", 8", 12" and 16" with the upper and lower protective boards making up the balance of the thickness of the mat. The upper and lower protective boards can also be provided in multiple layers rather than in larger thicknesses, and these are attached to the mat by the use of various fasteners that are generally known and used in the art. Bolting is preferred, however, as that allows any damaged beams or boards to be removed and replaced while the core of the mat is reused.

Therefore, in sum, it is to be realized that the optimum dimensional relationships for the parts of the invention can include variations and tolerances in size, materials, shape, form, function and use are deemed readily apparent and obvious to the skilled artisan, and all equivalent relationships to those illustrated in the drawings and described in the specification are intended to be encompassed by the claims appended hereto.

Unless defined otherwise, all technical and scientific terms used herein have same meaning as commonly understood by one of ordinary skill in the art to which this invention belongs. Also, as used herein and in the appended claims, the singular form "a", "and", and "the" include plural referents unless the context clearly dictates otherwise. All technical and scientific terms used herein have the same meaning.

The foregoing detailed description is considered as illustrative only of the principles of the invention. Further, since numerous modifications and changes will readily be apparent to those having ordinary skill in the art, it is not desired to limit the invention to the exact constructions demonstrated. In particular, it would be understood that the various sizes, materials, configurations and arrangements disclosed herein may be combined and constructed in any way that is feasible to create a hybrid may for any particular end use. Accordingly, all suitable modifications and equivalents may be resorted to falling within the scope of the appended claims.

What is claimed is:

1. A crane mat comprising:
   outer side members comprising first and second side beams or boards of engineered lumber, oak or other hardwoods, or bumper members of solid or filled or unfilled hollow plastic members that optionally may be reinforced;
   a core structure comprising a metal frame that includes side and end members and that contains therein a plurality of longitudinal members made of pine or other softwoods;
   external components including an upper layer of elongated members located above and attached to the core structure to protect the core structure, a lower layer of elongated members located below and attached to the core structure to also protect the core structure, or both of the upper and lower layers; and
   a plurality of joining rods that attach the outer side members to the core structure;
   wherein the elongated members are made of wood, engineered wood, or a thermoplastic, thermosetting plastic, or elastomeric material.

2. The crane mat of claim 1 wherein the outer side members, side members of the frame and longitudinal members each include a plurality of spaced lateral apertures passing therethrough, with the lateral apertures being in alignment to form bores through the mat; wherein each joining member passes through each of the previously mentioned members through the aligned lateral apertures to hold the members together in the mat.

3. The crane mat of claim 2 further comprising steel plates of substantially the same height as the longitudinal members with each plate located between adjacent longitudinal members, wherein the joining rods also pass through the steel plates to hold those components together in the mat.

4. The crane mat of claim 1, further comprising one or more lifting elements each located in an opening in that is at least partially present in an elongated member of the upper or lower layer and a subjacent longitudinal member or present in adjacent elongated and longitudinal members of the upper or lower layer, with each lifting element connected to a joining rod to secure the lifting element to the mat; and with the lifting element(s) comprising a loop portion that is configured with an opening sufficient to receive and allow grasping by a hook, fingers, hand or other lifting member, and a securement portion that includes an opening sufficient to receive a joining member therein, with the loop and securement portions either connected to each other or forming a unitary lifting element, and with a joining member passing through the securement portion to attach the lifting element to the mat;
   wherein the opening is configured and dimensioned to receive the lifting element therein in a storage position with the lifting element maintained at or below the surface of the mat when not used for lifting or moving of the mat or when securing articles thereto, and wherein the loop portion is movable to a lifting position that exposes the loop above the surface of the mat for engagement by a hook or other grasping element for certified overhead lifting, manipulation or movement of the mat or for securing other articles to the lifting element.

5. The crane mat of claim 1 wherein the frame member further comprises one or a plurality of cross members attached to side members to strengthen the frame, with the longitudinal members located between cross members and with additional filler members located between the cross members and end members of the frame, wherein a joining member passes through the additional filler members through aligned lateral apertures therein to hold those members together in the mat.

6. The crane mat of claim 5, further comprising one or more lifting elements each located in an opening in that is at least partially present in an elongated member of the upper or lower layer and a subjacent longitudinal member or present in adjacent elongated and longitudinal members of the upper or lower layer, with each lifting element connected to a cross member to secure the lifting element to the mat; and with the lifting element(s) comprising a loop portion that is configured with an opening sufficient to receive and allow grasping by a hook, fingers, hand or other lifting member, and a securement portion that is connected to the cross member to attach the lifting element to the mat, with the loop and securement portions either connected to each other or forming a unitary lifting element;
  wherein the opening is configured and dimensioned to receive the lifting element there in in a storage position with the lifting element maintained at or below the surface of the mat when not used for lifting or moving of the mat or when securing articles thereto, and wherein the loop portion is movable to a lifting position that exposes the loop above the surface of the mat for engagement by a hook or other grasping element for certified overhead lifting, manipulation or movement of the mat or for securing other articles to the lifting element.

7. The crane mat of claim 1 further comprising outer end members to protect the end members of the frame, the outer end members comprising first and second side beams of engineered lumber, oak or other hardwoods, or bumper members of solid or filled or unfilled hollow plastic members that optionally may be reinforced.

8. The crane mat of claim 1 wherein the side and end members of the frame are made of steel C-beams that retain the longitudinal members therebetween, and wherein the elongated members of the upper or lower layers extend across the entire width and length of the mat including over the outer side members to form a working surface for the mat.

9. The crane mat of claim 1 wherein the outer side members each have a top surface and is located in a position that aligns the top surface of each outer side member with the upper surfaces of the elongated members of the upper layer to form an upper working surface for the mat; and wherein the outer side members each also have a bottom surface and is located in a position that aligns the bottom surface of each outer side member with the lower surfaces of the elongated members of the lower layer to form a lower working surface for the mat.

10. The crane mat of claim 1 further comprising:
  steel plates of substantially the same height as the longitudinal members with each plate located between adjacent longitudinal members, wherein the joining rods also pass through the steel plates to hold those components together in the mat;
  outer end members to protect the end members of the frame, the outer end members comprising first and second side beams of engineered lumber, oak or other hardwoods; and
  at least two lifting elements, one located near each end of the mat, with each lifting element located in an opening in that is at least partially present in an elongated member of the upper or lower layer and a subjacent longitudinal member or present in adjacent elongated and longitudinal members of the upper or lower layer, with each lifting element connected to a joining rod to secure the lifting element to the mat; and with the lifting element(s) comprising a loop portion that is configured with an opening sufficient to receive and allow grasping by a hook, fingers, hand or other lifting member, and a securement portion that includes an opening sufficient to receive a joining member therein, with the loop and securement portions either connected to each other or forming a unitary lifting element, and with a joining member passing through the securement portion to attach the lifting element to the mat;
  wherein the opening is configured and dimensioned to receive the lifting element therein in a storage position with the lifting element maintained at or below the surface of the mat when not used for lifting or moving of the mat or when securing articles thereto, and wherein the loop portion is movable to a lifting position that exposes the loop above the surface of the mat for engagement by a hook or other grasping element for certified overhead lifting, manipulation or movement of the mat or for securing other articles to the lifting element; and
  wherein the outer side members are beams or boards of engineered lumber, oak or other hardwoods and the elongated members of the external components are boards of engineered wood, oak or other hardwoods; and
  wherein the outer side members, side members of the frame and longitudinal members each include a plurality of spaced lateral apertures passing therethrough, with the lateral apertures being in alignment to form bores through the mat; wherein each joining member passes through each of the previously mentioned members through the aligned lateral apertures to hold the members together in the mat.

11. The crane mat of claim 1, further comprising:
  steel plates of substantially the same height as the longitudinal members with each plate located between adjacent longitudinal members, wherein the joining rods also pass through the steel plates to hold those components together in the mat;
  outer end members to protect the end members of the frame, the outer end members comprising first and second side beams of engineered lumber, oak or other hardwoods;
  at least two cross members attached to side members to strengthen the frame, with the longitudinal members located between the cross members and with additional filler members located between the cross members and end members of the frame, wherein a joining member passes through the additional filler members through aligned lateral apertures therein to hold those members together in the mat; and
  at least two lifting elements, one located near each end of the mat, with each lifting element connected to a cross member to secure the lifting element to the mat; and with the lifting element(s) comprising a loop portion that is configured with an opening sufficient to receive and allow grasping by a hook, fingers, hand or other lifting member, and a securement portion that is connected to the cross member to attach the lifting element to the mat, with the loop and securement portions either connected to each other or forming a unitary lifting element;

wherein the opening is configured and dimensioned to receive the lifting element therein in a storage position with the lifting element maintained at or below the surface of the mat when not used for lifting or moving of the mat or when securing articles thereto, and wherein the loop portion is movable to a lifting position that exposes the loop above the surface of the mat for engagement by a hook or other grasping element for certified overhead lifting, manipulation or movement of the mat or for securing other articles to the lifting element; and wherein the outer side members are beams or boards of engineered lumber, oak or other hardwoods and the elongated members of the external components are boards of engineered wood, oak or other hardwoods; and wherein the outer side members, side members of the frame and longitudinal members each include a plurality of spaced lateral apertures passing therethrough, with the lateral apertures being in alignment to form bores through the mat; wherein each joining member passes through each of the previously mentioned members through the aligned lateral apertures to hold the members together in the mat.

12. A lifting element for a crane mat that has a working surface, a plurality of longitudinal members, and an opening or recess for receiving the lifting element, with the lifting element comprising:

a loop portion that is configured with an opening sufficient to receive and allow grasping by a hand, fingers, or a hook or other lifting member;

a support member for supporting the loop portion;

a body member for joining the loop and securement portions, wherein the body member extends in the channel and into the mat away from the support member, and is fixed in position by the support member and securement portion;

a securement portion for securing the lifting element to the mat;

wherein the loop portion, support member and securement portions are connected to each other; and wherein the support member is secured to the opening or recess in the mat with the opening configured and dimensioned to have a floor for receiving the support member, a channel for receiving the securement portion, and a depth that allows the lifting element to be received in the opening with the loop portion in a storage position that is maintained at or below the working surface of the mat when not used for lifting or moving of the mat or for securing articles thereto, and wherein the support member and securement portion are fixed in the mat while the loop portion is movable to a lifting position that exposes the loop above the working surface of the mat for engagement by a hook or other grasping element for certified overhead lifting, manipulation or movement of the mat or for securing other articles to the mat.

13. The lifting element of claim 12, wherein the body member comprises an elongated rod that passes through the mat from the working surface to the opposite side, the support member is a head portion of the elongated rod that has openings for receiving and securing the loop portion thereto, and the securement portion comprises a threaded end of the rod member and a fastening nut, such that the lifting element is secured to the mat with the head and loop portions provided in the opening and with the nut present in an opening or recess on the opposite side of the mat from the working surface.

14. The lifting element of claim 13, further comprising a first contact plate present between the head portion and the floor of the opening; a second contact plate between the nut and the recess; or both first and second contact plates so that the lifting element is more securely attached to the mat.

15. The lifting element of claim 12, wherein the loop portion is a ring member that is secured to the support member in a manner that allows the ring to pivot between the storage and lifting positions, the body member comprises a first plate that passes into the mat, the support member has a thickness that is greater than that of the first plate and the mat includes lateral rods for joining together the longitudinal members and the securement portion includes an opening in the first plate sufficient to receive therein one of the lateral rods of the crane mat to attach the lifting element to the mat.

16. The lifting element of claim 12, wherein the body member comprises a first plate that passes into the mat, the support member is a second plate oriented perpendicular to the first plate, wherein the support member plate includes holes to receive fasteners that secure the support member plate to the floor of the opening or recess, wherein the mat includes lateral rods for joining together the longitudinal members and the securement portion includes an opening in the first plate sufficient to receive therein one of the lateral rods of the crane mat to attach the lifting element to the mat.

17. The lifting element of claim 16, wherein the loop portion is a D-ring that is attached to the support member by a U-shaped member that is welded to one side of the second plate, and the body member is welded to the opposite side of the second plate.

18. A crane mat having a working surface and an opening or recess in the working surface, the crane mat comprising:

outer side members comprising first and second side beams or boards of engineered lumber, oak or other hardwoods, or bumper members of solid or filled or unfilled hollow plastic members that optionally may be reinforced;

a core structure comprising a plurality of longitudinal members;

a plurality of joining rods that attach the outer side members to the longitudinal members of the core structure; and one or more lifting elements comprising a loop portion that is configured with an opening sufficient to receive and allow grasping by a hand, fingers, or a hook or other lifting member, a support member for supporting the loop portion, and a securement portion for securing the lifting element to the mat, wherein the loop portion, support member and securement portions are connected to each other;

wherein the opening is configured and dimensioned to have a floor for receiving the support member, a channel for receiving the securement portion, and a depth that allows the lifting element to be received in the opening with the loop portion in a storage position that is maintained at or below the working surface of the mat when not used for lifting or moving of the mat or for securing articles thereto, wherein the support member is secured to the floor of the opening or recess with the securement portion fixed in position in the mat, wherein the loop portion is movable to a lifting position that exposes the loop above the working surface of the mat for engagement by a hook or other grasping element for certified overhead lifting, manipulation or movement of the mat or for securing other articles to the mat.

19. The crane mat of claim 18, wherein upper surfaces of the longitudinal members form at least part of the working surface of the mat, wherein the opening or recess is present in one or adjacent longitudinal members, and wherein the mat optionally includes metal plates of the same height and length as the longitudinal members and which are provided between adjacent longitudinal members.

20. The crane mat of claim 18, further comprising external components including an upper layer of elongated members located above and attached to the core structure to protect the core structure, a lower layer of elongated members located below and attached to the core structure to also protect the core structure, or both of the upper and lower layers; wherein the elongated members are made of wood, engineered wood, metal or a thermoplastic, thermosetting plastic, or elastomeric material, wherein each lifting element is located in an opening that is at least partially present in an elongated member of the upper or lower layer and a subjacent longitudinal member or present in adjacent elongated and longitudinal members, with each lifting element connected to a joining rod to secure the lifting element to the mat.

21. The crane mat of claim 18, wherein the lifting element further comprises a body member for joining the loop and securement portions, wherein the body member extends in the channel and into the mat away from the support member, and is fixed in position by the support member and securement portion, wherein the securement portion includes an opening sufficient to receive a joining rod therein, and with a joining rod passing through the securement portion to attach the lifting element to the mat.

22. The crane mat of claim 18, wherein the core structure further comprises a metal frame that includes side and end members, and wherein the outer side members, side members of the frame and longitudinal members each include a plurality of spaced lateral apertures passing therethrough, with the lateral apertures being in alignment to form bores through the mat; wherein each joining rod passes through each of the previously mentioned members through the aligned lateral apertures and bores to hold the members together in the mat.

23. A crane mat comprising a plurality of longitudinal beams that are positioned in a side by side arrangement; each of the beams having a plurality of spaced lateral apertures passing therethrough, with the lateral apertures being in alignment to form bores through the mat; a plurality of lateral rods with each rod passing through each beam through the aligned lateral apertures to hold the beams together in the side by side arrangement; at least one opening or recess provided in one of the beams or in and between adjacent beams wherein one lateral rod passes through a lower portion of the opening; and at least one lifting element received in the at least one opening or recess, wherein the lifting element comprises:
   a loop portion that is configured with an opening sufficient to receive and allow grasping by a hand, fingers, or a hook or other lifting member;
   a support member for supporting the loop portion; and
   a securement portion for securing the lifting element to the mat;
   wherein the loop portion, support member and securement portions are connected to each other; and
   wherein the support member of the lifting element is secured to the opening or recess in the mat with the opening configured and dimensioned to have a floor for receiving the support member, a channel for receiving the securement portion, and a depth that allows the lifting element to be received in the opening with the loop portion in a storage position that is maintained at or below the working surface of the mat when not used for lifting or moving of the mat or for securing articles thereto; and
   wherein the securement portion has an opening that allows a lateral rod to pass therethrough to help secure the lifting element to the mat; and
   wherein the support member and securement portion are fixed in the mat while the loop portion is movable to a lifting position that exposes the loop above the working surface of the mat for engagement by a hook or other grasping element for certified overhead lifting, manipulation or movement of the mat or for securing other articles to the mat.

24. The crane mat of claim 23 which includes a plurality of openings or recesses in the beams or between adjacent beams, and a plurality of lifting elements, wherein each lifting element is associated with an opening or recess.

* * * * *